United States Patent
Seo et al.

(10) Patent No.: US 8,781,979 B2
(45) Date of Patent: Jul. 15, 2014

(54) PREDICTION METHOD FOR MONITORING PERFORMANCE OF POWER PLANT INSTRUMENTS

(75) Inventors: In Yong Seo, Daejeon (KR); Moon Ghu Park, Daejeon (KR); Jae Yong Lee, Daejeon (KR); Ho Cheol Shin, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 570 days.

(21) Appl. No.: 12/574,435

(22) Filed: Oct. 6, 2009

(65) Prior Publication Data

US 2010/0274745 A1    Oct. 28, 2010

(30) Foreign Application Priority Data

Apr. 22, 2009    (KR) .................. 10-2009-0035254

(51) Int. Cl.
G06F 15/18    (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| 5,815,413 | A * | 9/1998 | Hively et al. ................... 702/191 |
| 2003/0088562 | A1 * | 5/2003 | Dillon et al. ...................... 707/5 |

OTHER PUBLICATIONS

Teknomo, Kardi. "Normalization" CNV Media 2006 Verified by wayback machine. [Online] Downloaded May 14, 2012 http://web.archive.org/web/20100626111038/http://people.revoledu.com/kardi/tutorial/similarity/Normalization.html.*

Seo, In-Yong and Kim Seong-Jun. "An On-line calibration Monitoring Technique Using Support Vector Regression and Principal Component Analysis" 2008 [Online] Downloaded May 14, 2012 http://ieeexplore.ieee.org/stamp/stamp.jsp?arnumber=05172704.*

Chinese Office Action issued in Chinese Patent Application No. CN 200910177970.8 dated Jul. 12, 2013.

In-Yong Seo et al., "An On-line Calibration Monitoring Technique Using Support Vector Regression and Principal Component Analysis," IEEE Computer Society 2008; CIMCA 2008, IAWTIC 2008, and ISE 2008.

X. G. Hua et al., "Modeling of Temperature-Frequency Correlation Using Combined Principal Component Analysis and Support Vector Regression Technique," Journal of Computing in Civil Engineering © ASCE Mar./Apr. 2007.

* cited by examiner

*Primary Examiner* — Ben Rifkin
(74) *Attorney, Agent, or Firm* — McDermott Will & Emery LLP

(57) ABSTRACT

Disclosed is a prediction method for monitoring performance of power plant instruments. The prediction method extracts a principal component of an instrument signal, obtains an optimized constant of a SVR model through a response surface methodology using data for optimization, and trains a model using training data. Therefore, compared to an existing Kernel regression method, accuracy for calculating a prediction value can be improved.

19 Claims, 26 Drawing Sheets

PREDICTION METHOD FOR MONITORING PERFORMANCE OF POWER PLANT INSTRUMENTS

CROSS-REFERENCE TO RELATED APPLICATION

This application claims priority to and the benefit of Korean Patent Application No. 10-2009-0035254, filed on Apr. 22, 2009, which is herein incorporated by reference in its entirety.

BACKGROUND OF THE INVENTION

1. Field of the Invention

The present invention relates generally to a prediction method for monitoring performance of power plant instruments. More particularly, the present invention relates to a prediction method for monitoring performance of power plant during a nuclear power plant operation continually and consistently.

2. Description of the Related Art

In general, all power generating facilities are equipped with a plurality of instruments and obtains various signals in real-time from the plurality of instruments to utilize the obtained various signals in power plant's surveillance and protection systems. Especially, nuclear power plant's measurement channels, related to a safety system, employ multi-instrument concept so as to guarantee accuracy and reliability of measurement signals and also examine and correct power plant instruments at an interval of a nuclear fuel cycle, e.g., approximately 18 months, as read in guidelines for operating technique. All over the world, nuclear power plants have been developing a method for lengthening monitoring and correction periods of unnecessarily-performed instrument correction tasks through a Condition Based Monitoring (CBM) method.

FIG. 1 is a block diagram of a conventional instrument performance regular monitoring system. This system is called an Auto-Associative model. Referring to FIG. 1, the conventional instrument performance regular monitoring system includes a prediction model, a comparison module and a decision logic. The conventional instrument performance regular monitoring system can monitor drift and malfunction of instruments by inputting measuring values into the prediction model, outputting prediction values of the prediction model with respect to an input measurement values, inputting differences between measurement values and the prediction values into the decision logic through the comparison module and continuously monitoring the instruments.

As a method for calculating a prediction value of an instrument, a linear regression method is the most widely used. This method selects signals of other instruments that have a high linear correlation with respect to a signal of an instrument that will be predicted, and obtains a regression coefficient to allow the sum of squares for error of a prediction value and a measurement value to be the minimum. This method can be expressed as the following Equation 1.

$$\Sigma E^2 = \Sigma (Y - Y')^2 \qquad \text{<Equation 1>}$$

The linear regression method can predict independent variables with respect to unknown dependent variables once a regression coefficient is determined with already-known dependent and independent variables. However, in an existing linear regression method, if dependent variables have large linear relationships, multicollinearity may occur such that large errors may occur in independent variables with respect to small noise included in dependent variables.

A Kernel regression method is a non-parametric regression method that stores selected measurement data as a memory vector, obtains a weight value of Kernel from Euclidean distance of a training data set in a memory vector with respect to a measurement signal set, and applies the weight value to the memory vector to obtain a prediction value of a measurement instrument without using a parameter such as a regression coefficient, a weight value that optimizes correlation of an input and an output like an existing linear regression method, or a neural network. The non-parametric regression method such like the Kernel regression method has a strong advantage over a model having a nonlinear state of an input/output relationship and signal noise.

The existing Kernel regression method has a calculation procedure as the following 5 steps.

First Step: Training data are represented with a matrix of Equation 2.

$$X = \begin{bmatrix} X_{1,1} & X_{1,2} & \cdots & X_{1,m} \\ X_{2,1} & X_{2,2} & \cdots & X_{2,m} \\ \vdots & \vdots & \ddots & \vdots \\ X_{n_{tm},1} & X_{n_{tm},2} & \cdots & X_{n_{tm},m} \end{bmatrix} \qquad \text{<Equation 2>}$$

where X is a training data matrix stored in a memory vector, n is the number of training data, and m is a number of an instrument.

Second Step: The sum of Euclidian distance of training data for a first instrument signal set is obtained through the following Equation 3.

$$d(x_1, q_1) = \sqrt{\sum_j (x_{1j} - q_{1j})^2} \qquad \text{<Equation 3>}$$

$$d(x_2, q_1) = \sqrt{\sum_j (x_{2j} - q_{1j})^2}$$

$$\vdots$$

$$d(x_{trn}, q_1) = \sqrt{\sum_j (x_{tm\,j} - q_{1j})^2}$$

where x is training data, q is test data (or, Query data), trn is a number of training data, and j is a number of an instrument.

Third step: A weight value with respect to each of training data sets and given test data sets is obtained through the following Equation 4 including a Kernel function.

$$w_1 = \sqrt{K(d(x_1, q_1))} \qquad \text{<Equation 4>}$$

$$w_2 = \sqrt{K(d(x_2, q_1))}$$

$$\vdots$$

$$w_{tm} = \sqrt{K(d(x_{tm}, q_1))}$$

In Equation 4, Gaussian Kernel, used as a weight function, is defined as follows.

$$K(d) = e^{-\left(\frac{d^2}{\sigma^2}\right)}.$$

Forth step: A prediction value of test data is obtained by multiplying a weight value by each training data and dividing its result by the sum of weight values as the following Equation 5.

$$\tilde{y}(q_1) = (x_{tm}, j * w) / \sum w \qquad <\text{Equation 5}>$$

$$\tilde{y}(q_1) = \left( \begin{bmatrix} X_{1,1} & X_{1,2} & \ldots & X_{1,j} \\ X_{2,1} & X_{2,2} & \ldots & X_{2,j} \\ \vdots & \vdots & \ddots & \vdots \\ X_{n_{tm},1} & X_{n_{tm},2} & \ldots & X_{n_{tm},j} \end{bmatrix} * \begin{bmatrix} w_1 \\ w_2 \\ \vdots \\ w_{tmr} \end{bmatrix} \right) / \sum w$$

Fifth step: Second to fourth steps are repeated in order to obtain a prediction value with respect to entire test data.

The existing Kernel regression method has a strong advantage over a nonlinear model and signal noise. However, the existing Kernel regression method has disadvantages such as low accuracy due to dispersion increase of an output prediction value compared to a linear regression analysis method. The dispersion increase occurs because the Auto-Associative Kernel Regression (AAKR) method stores selective measurement data as a memory vector, obtains a weight value of Kernel from Euclidean distance of a training data set in a memory vector with respect to a measurement signal set, and applies the weight value to the memory vector to obtain a prediction value of an instrument.

SUMMARY OF THE INVENTION

In accordance with one embodiment, a prediction method for monitoring performance of power plant instruments includes displaying entire data in a matrix, normalizing the entire data into a data set, trisecting the normalized data set into three data sets, wherein the three data sets comprising a training data set, a optimization data set, and a test data set, extracting a principal component of each of the normalized training data set, the optimization data set, and the test data set, calculating an optimal constant of a Support Vector Regression (SVR) model to optimize prediction value errors of data for optimization using a response surface method, generating the Support Vector Regression (SVR) training model using the optimal constant, obtaining a Kernel function matrix using the normalized test data set as an input and predicting an output value of the support vector regression model, and de-normalizing the output value into an original range to obtain a predicted value of a variable.

It is therefore a feature of one embodiment to provide a prediction method for monitoring performance of plant instruments using a main factor analysis and Support Vector Regression (SVR) to improve calculation accuracy of a prediction value compared to the existing Kernel regression method. That is, this method is provided to improve conventional low prediction accuracy. The method uses plant data normalization, principal component extraction, optimization of parameters (Kernel bandwidth $\sigma$, loss function constant $\epsilon$, penalty C) of a SVR model regression method using a response surface methodology, realization of a SVR model through the above, and a de-normalization method of an output prediction value in order to model a plant system, and then monitors instrument signals.

At least one of the above and other features and advantages may be realized by providing a prediction method for monitoring performance of plant instruments that extracts principal components of power plant data, creates various case models about a system using a SVR method, optimizes three parameters of a regression Equation using a response surface analysis method, and monitors instrument signals after power plant systems are modeled using the three parameters. Therefore, compared to a widely-used existing Kernel regression method, calculation accuracy of a prediction value can be improved.

These and other features of the present invention will be more readily apparent from the detailed description set for the below taken in conjunction with the accompanying drawings.

BRIEF DESCRIPTION OF THE DRAWINGS

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments of the present invention will now be described in detail with reference to the accompanying drawings.

Figure 1:
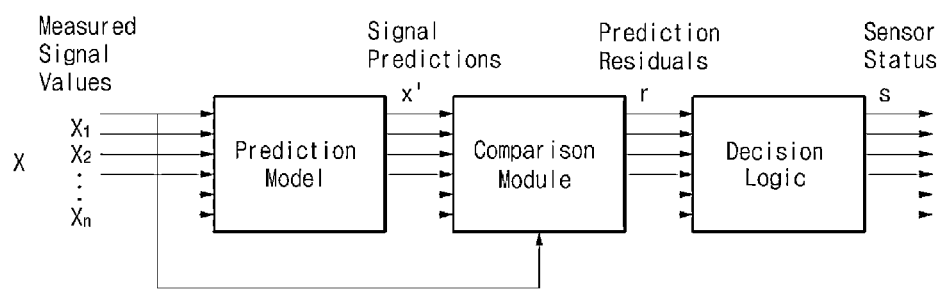
FIG. 1 is a block diagram of a conventional instrument performance regular monitoring system.
Figure 2:
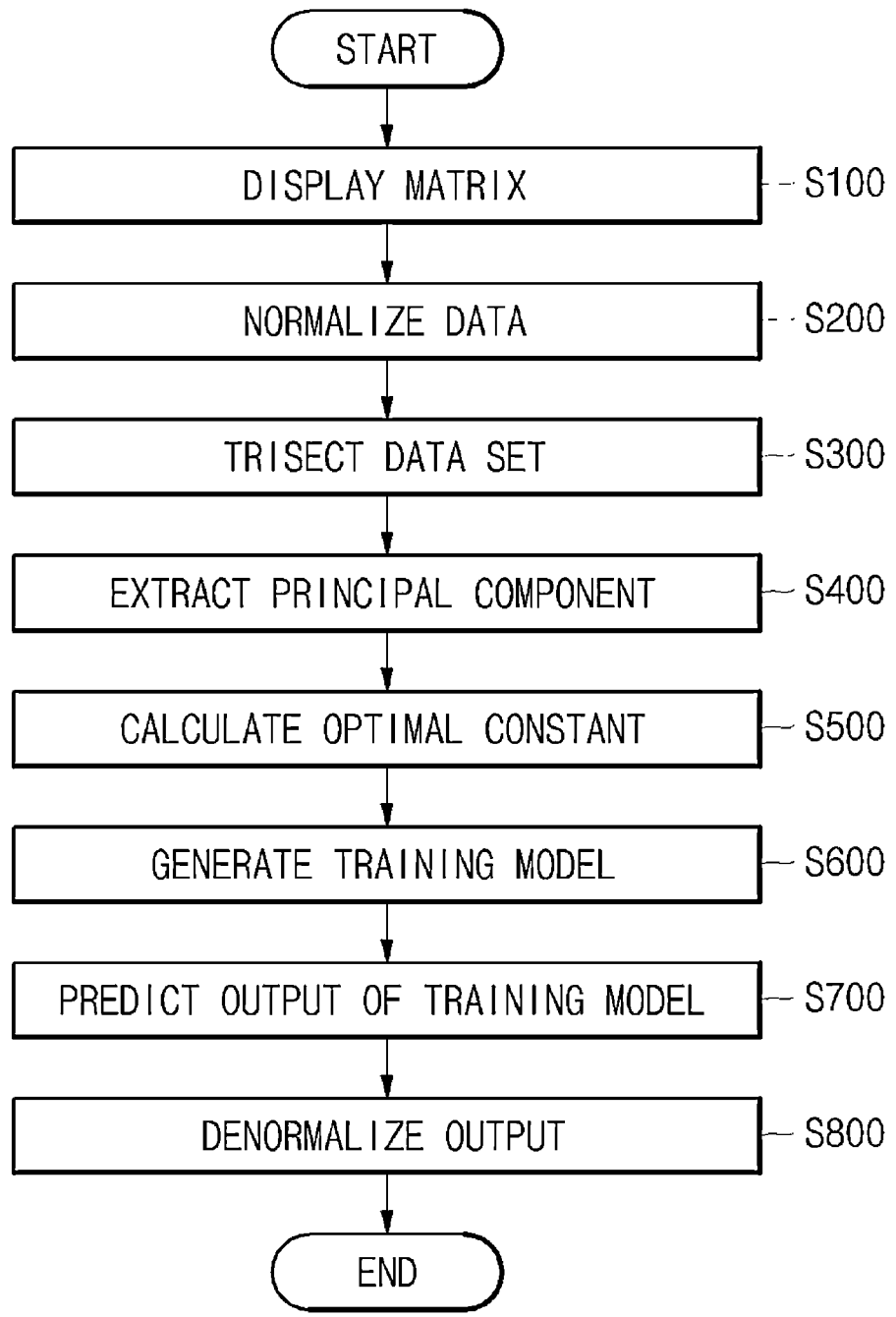
FIG. 2 is a flowchart illustrating a prediction method for monitoring performance of power plant instruments according to one embodiment of the present invention.

FIG. 2 is a flowchart illustrating a prediction method for monitoring performance of power plant instruments according to one embodiment of the present invention.

Referring now to FIG. 2, the prediction method for monitoring performance of power plant instruments includes displaying entire data in a matrix, normalizing the entire data into a data set, trisecting the normalized data set into three data sets, wherein the three data sets comprising a training data set, a optimization data set, and a test data set, extracting a principal component of each of the normalized training data set, optimization data set, and test data set, calculating an optimal constant of a Support Vector Regression (SVR) model to optimize prediction value errors of data for optimization using a response surface method, generating the Support Vector Regression (SVR) training model using the optimal constant, obtaining a Kernel function matrix using the normalized test data set as an input and predicting an output value of the support vector regression model, and de-normalizing the output value into an original range to obtain a predicted value of a variable.

In an alternative prediction method for monitoring performance of power plant instruments includes displaying entire data in a matrix, normalizing the entire data into a data set, extracting a principal component of the normalized data set, calculating an optimal constant of a Support Vector Regression (SVR) model to optimize prediction value errors of data for optimization using a response surface method, generating the Support Vector Regression (SVR) model using the optimal constant, obtaining a Kernel function matrix using the normalized data set as an input and predicting an output value of the support vector regression model, and denormalizing the output value into an original range to obtain a predicted value of a variable.

The prediction method for monitoring performance of power plant instruments including the above configuration according to one embodiment of the present invention is as follows.

First, displaying a matrix in operation S100 displays entire data in a matrix as shown in Equation 6.

$$X = \begin{bmatrix} X_{1,1} & X_{1,2} & \ldots & X_{1,m} \\ X_{2,1} & X_{2,2} & \ldots & X_{2,m} \\ \vdots & \vdots & \ddots & \vdots \\ X_{3n,1} & X_{3n,2} & \ldots & X_{3n,m} \end{bmatrix} \quad <\text{Equation 6}>$$

$$= [X_1 \ X_2 \ \ldots \ X_m]$$

$$X_{ts} = [X_{3i+1,1} \ X_{3i+1,2} \ \ldots \ X_{3i+1,m}]$$

$$= [X_{ts1} \ X_{ts2} \ \ldots \ X_{tsm}]$$

$$X_{tr} = [X_{3i+2,1} \ X_{3i+2,2} \ \ldots \ X_{3i+2,m}]$$

$$= [X_{tr1} \ X_{tr2} \ \ldots \ X_{trm}]$$

$$X_{op} = [X_{3i+3,1} \ X_{3i+3,2} \ \ldots \ X_{3i+3,m}]$$

$$= [X_{op1} \ X_{op2} \ \ldots \ X_{opm}]$$

where X is an entire data set. $X_{tr}$, $X_{op}$, and $X_{ts}$ are a data set for training, a data set for optimization, and a data set for test, respectively. 3n is the entire number of data and m is a number of an instrument.

Next, performing normalization in operation S200 normalizes entire data using the following Equation 7.

$$Z_i = \frac{X_i - \min(X_i)}{\max(X_i) - \min(X_i)} \quad <\text{Equation 7}>$$

where i=1, 2, . . . , 3n

A data set Z of the entire normalized data can be represented by the following Equation 8.

$$X = \begin{bmatrix} Z_{1,1} & Z_{1,2} & \ldots & X_{1,m} \\ X_{2,1} & X_{2,2} & \ldots & X_{2,m} \\ \vdots & \vdots & \ddots & \vdots \\ Z_{3n,1} & Z_{3n,2} & \ldots & Z_{3n,m} \end{bmatrix} \quad <\text{Equation 8}>$$

$$= [Z_1 \ Z_2 \ \ldots \ Z_m]$$

Performing separation in operation S300 separates the data set Z into three parts such as training, optimization, and test. In this embodiment of the present invention, the trisected data are respectively called as $Z_{tr}$, $Z_{op}$, and $Z_{ts}$ and can have an n×m size like the following Equation 9.

$Z_{ts} = [Z_{3i+1,1} \ Z_{3i+1,2} \ldots Z_{3i+1,m}]$ $Z_{tr} = [Z_{3i+2,1} \ Z_{3i+2,2} \ldots Z_{3i+2,m}]$ $Z_{op} = [Z_{3i+3,1} \ Z_{3i+3,2} \ldots Z_{3i+3,m}]$  <Equation 9> where i=0, 1, 2, . . . , n−1.

Extracting a principal component in operation S400 extracts principal components of each of the normalized data sets $Z_{tr}$, $Z_{op}$, and $Z_{ts}$. Dispersion, which is a engenvalue of a covariance matrix, of principal components is arranged according to its size, and principal components $P_{tr}$, $P_{op}$, and $P_{ts}$ with respect to $Z_{tr}$, $Z_{op}$, and $Z_{ts}$ are selected until a cumulative sum reaches greater than 99.5%, starting with the principal component of the largest percentage dispersion value.

Regarding a method for obtaining principle components, a Principal Component Analysis (PCA) is a useful method for compressing numerous input variables into a few variables through linear transformation. The compressed variable is called as a principal component. The PCA uses correlation between variables to radiate data of an original dimension into a hyperplane of a low dimension where the sum of their squares is maximized.

Next, a procedure for extracting a principal component is described. If input variables of an m-dimension are called as $x_1, x_2, \ldots, x_m$, and new variables generated by a linear combination thereof are called as $\theta_1, \theta_2, \ldots, \theta_m$, their relationship can be represented by Equation 10 and Equation 11.

$$\theta_1 = q_{11}z_1 + q_{12}z_2 + \ldots + q_{1m}z_m \quad <\text{Equation 10}>$$
$$\theta_2 = q_{21}z_1 + q_{22}z_2 + \ldots + q_{2m}z_m$$
$$\ldots$$
$$\theta_m = q_{m1}z_1 + q_{m2}z_2 + \ldots + q_{mn}z_m$$

$$\Theta = QZ \quad <\text{Equation 11}>$$

$$\Theta = \begin{bmatrix} \theta_1 \\ \theta_2 \\ \vdots \\ \theta_m \end{bmatrix}$$

$$Q = \begin{bmatrix} q_{1,1} & q_{2,1} & \cdots & q_{m,1} \\ q_{1,2} & q_{2,2} & \cdots & q_{m,2} \\ \vdots & \vdots & \ddots & \vdots \\ q_{1,m} & q_{2,m} & \cdots & q_{n,m} \end{bmatrix}$$
$$= [q_1 \ q_2 \ \cdots \ q_m]$$

$$Z = \begin{bmatrix} z_1 \\ z_2 \\ \vdots \\ z_n \end{bmatrix}$$

Here, Q is linear transformation and Z is the normalized entire data set. $\theta_1, \theta_2, \theta_m$ are called as principal components of a linear system. For convenience, the first principal component is designated as the most important principal component. The most important principal component describes the greatest changes of an input variable, that is, a principal component of the largest dispersion. The linear transformation Q is used for determination in order to satisfy conditions of the following Equation 12 and Equation 13.

$$q_{i1}^2 + q_{i2}^2 + \ldots + q_{im}^2 = 1 \text{ for } i=1, 2, \ldots, m \quad <\text{Equation 12}>$$

$$q_{i1}q_{j1} + q_{i2}q_{j2} + \ldots + q_{im}q_{jm} = 0 \text{ for } i \neq j \quad <\text{Equation 13}>$$

The condition of Equation 12 maintains a scale after transformation and the condition of Equation 13 removes correlation between variables after transformation.

The principal components can be obtained through the following steps.

Step A. An average value of each variable is subtracted from each of the data sets $Z_{tr}$, $Z_{op}$, and $Z_{ts}$, and this is called as a matrix A. Here, the training data set $Z_{tr}$ is used as one example for description and the matrix A is represented by the following Equation 14.

$$A = Z_{tr} - \bar{Z}_{tr} \quad <\text{Equation 14}>$$

Step B. An eigenvalue $\lambda$ of $A^T A$ is obtained and a singular value S of A is obtained using Equations 15 through 17. The eigenvalues $\lambda$ except for 0 obtained through Equation 15 are arranged in a descending order, and these are called $\lambda_1, \lambda_2, \ldots, \lambda_m$, respectively.

$$|A^T A - \lambda I| = 0 \quad <\text{Equation 15}>$$

$$s_1 = \sqrt{\lambda_1}, s_2 = \sqrt{\lambda_2}, \ldots, s_m = \sqrt{\lambda_m}, \quad <\text{Equation 16}>$$
$$(\lambda_1 \geq \lambda_2 \geq \ldots \geq \lambda_m)$$

$$S = \begin{bmatrix} s_1 & 0 & \cdots & 0 \\ 0 & s_2 & \cdots & 0 \\ \vdots & \vdots & \ddots & 0 \\ 0 & 0 & \cdots & s_m \end{bmatrix} \quad <\text{Equation 17}>$$

where $A^T$ denotes the transpose of a matrix A and I is an identity matrix.

Step C. An eigenvector of $AA^T$, which is an n×n matrix, is obtained, and then a unitary matrix U is obtained. An eigenvalue $\lambda$ is obtained using Equation 18, and then is substituted into Equation 19 to obtain an eigenvector $e_1, e_2, \ldots, e_m$ of n×1 with respect to each eigenvalue $\lambda$.

$$|AA^T - \lambda I| = 0 \quad <\text{Equation 18}>$$

$$(AA^T - \lambda I)X = 0 \quad <\text{Equation 19}>$$

Step D. Dispersion of each principal component is obtained using Equation 20.

$$\sigma_p = \left(\frac{[s_1 \ s_2 \ \cdots \ s_m]}{\sqrt{n-1}}\right)^2 \quad <\text{Equation 20}>$$

Step E. Percentage is obtained by dividing dispersion of each principal component by the sum of dispersions of entire principal components using Equation 21 and Equation 22.

$$\sigma_{p\_tot} = \text{sum}\left(\frac{[s_1 \ s_2 \ \cdots \ s_m]}{\sqrt{n-1}}\right)^2 \quad <\text{Equation 21}>$$

$$\% \ \sigma_p = \left(\frac{\sigma_p}{\sigma_{p\_tot}}\right) \times 100 \quad <\text{Equation 22}>$$

Step F. The p number of principal components up to preferred percentage dispersion, preferably 99.98%, is selected by performing a cumulative calculation starting with the largest percentage dispersion % $\sigma_p$.

Step G. A principal component is extracted using Equation 23.

$$P_{tr} = [s_1 e_1 \ s_2 e_2 \ldots s_p e_p] \quad <\text{Equation 23}>$$

Step H. Principal components with respect to $Z_{op}$ and $Z_{ts}$ can be extracted using the above same steps.

Table 1 illustrates dispersions of extracted principal components. According to this embodiment of the present invention, 7 principal components are used as shown in Table 1. When the 7 principal components are used, 99.9% of entire dispersion can be explained. Therefore, information loss by abandoning the remaining principal components is just 0.02%.

TABLE 1

| No. | PC Var | Cum | Cum % |
|-----|--------|-----|-------|
| 1 | 0.70234 | 0.70234 | 84.12% |
| 2 | 0.07859 | 0.78093 | 93.54% |
| 3 | 0.0.02905 | 0.80999 | 97.02% |
| 4 | 0.01818 | 0.82816 | 99.20% |

TABLE 1-continued

| No. | PC Var | Cum | Cum % |
| --- | --- | --- | --- |
| 5 | 0.00357 | 0.83173 | 99.62% |
| 6 | 0.00226 | 0.83400 | 99.89% |
| 7 | 0.00071 | 0.83470 | 99.98% |
| 8 | 0.00011 | 0.83481 | 99.99% |
| 9 | 0.00004 | 0.83485 | 100.00% |
| 10 | 0.00002 | 0.83486 | 100.00% |
| 11 | 0.00001 | 0.83488 | 100.00% |

In the following description, SVR modeling is discussed in detail. Compressing input variables of an m-dimension into principal components $\theta_1, \theta_2, \ldots, \theta_m$ of a p-dimension can be represented by the following Equation 24.

$$\theta_1 = q_{11}x_1 + q_{12}x_2 + \cdots + q_{1m}x_m \qquad <\text{Equation 24}>$$
$$\theta_2 = q_{21}x_1 + q_{22}x_2 + \cdots + q_{mm}x_m$$
$$\ldots$$
$$\theta_p = q_{p1}x_1 + q_{p2}x_2 + \cdots + q_{pm}x_m$$

where p is an integer, which is equal to or less than m.

An Optimum Regression Line (ORL) obtained through SVR with respect to the $k^{th}$ output can be represented by the following Equation 25.

$$f_k(\theta) = w_K^T \theta + b_k \qquad <\text{Equation 25}>$$

where k is 1, 2, . . . , m.

Figure 4:
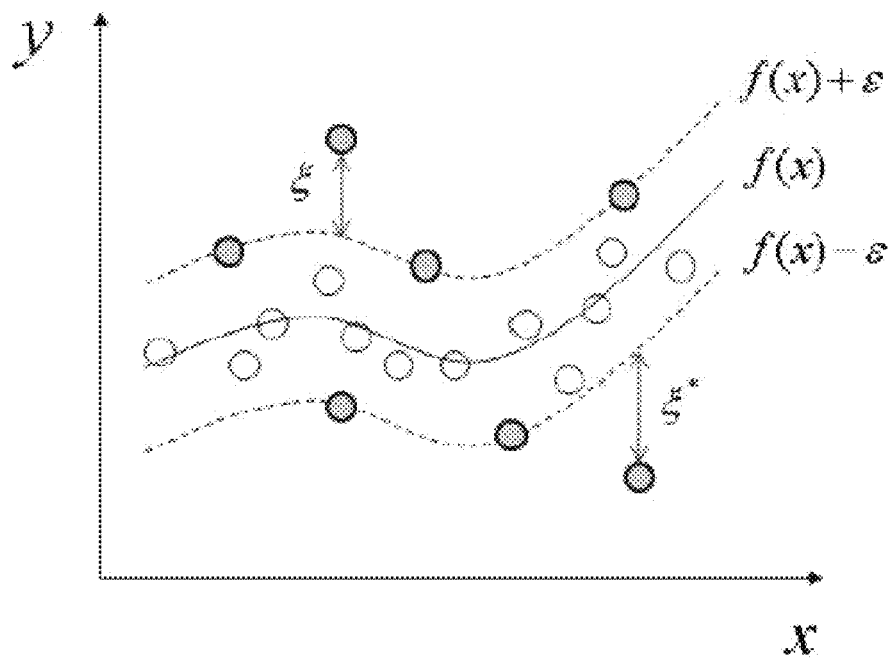
FIG. 4 illustrates a conceptual diagram of an Optimal Linear Regression (ORL) by SVR.

If $\epsilon$-insensitive Loss Function with respect to a $k^{th}$ output variable $y^{(k)}$ is defined by the following Equation 26, an optimization equation for obtaining an ORL with respect to $y^{(k)}$ can be represented by the following Equation 27.

$$L_k(y_k) = \begin{cases} 0, & |f_k(\theta) - y^{(k)}| < \varepsilon_k \\ |f_k(\theta) - y^{(k)}| - \varepsilon_k, & \text{elsewhere} \end{cases} \qquad <\text{Equation 26}>$$

$$\text{Minimize}\Phi(w_k, \xi_k) = \frac{1}{2} w_k^T w_k + C_k \sum_{i=1}^{n} (\xi_{k,i} + \xi_{k,i}^*) \qquad <\text{Equation 27}>$$

$$s.t. \quad y_i^{(k)} - w_k^T \theta_i - b \le \varepsilon_k + \xi_{k,i}$$
$$w_k^T \theta_i + b - y_i^{(k)} \le \varepsilon_k + \xi_{k,i}^*$$
$$\varepsilon_k, \xi_{k,i}, \xi_{k,i}^* \ge 0 \text{ for } i = 1, 2, \ldots, n$$

where k is 1, 2, . . . , m in Equations 26 and 27. $\xi_{ki}$ and $\xi_{ki}^*$ are slack variables as shown in FIG. 4. FIG. 4 illustrates a conceptual diagram of an ORL by SVR. Here, $\theta_i$ is a principal component vector corresponding to an $i^{th}$ observation value vector with respect to x, not an $i^{th}$ component of $\theta$.

The optimization problem may be represented as a dual problem by the following Equation 28.

$$\max \lambda_k,$$

$$\lambda_k^* \left\{ -\frac{1}{2} \sum_{i=1}^{n} \sum_{j=1}^{n} (\lambda_{k,i} - \lambda_{k,j}^*) \theta_i^T \theta_j + \sum_{i=1}^{n} [\lambda_{k,i}(y_i^{(k)} - \varepsilon_k) - \lambda_{k,j}^*(y_i^{(k)} - \varepsilon_k)] \right\} \qquad <\text{Equation 28}>$$

$$s.t. \quad 0 \le \lambda_{k,i}, \lambda_{k,j}^* \le C_k \text{ for } i = 1, 2, \ldots, n$$

$$\sum_{i=1}^{n} (\lambda_{k,i} - \lambda_{k,j}^*) = 0$$

where k is 1, 2, . . . , m.

Accordingly, Lagrange multipliers $\lambda_{k,i}$ and $\lambda_{ki}^*$ are substituted into Equation 29 to determine an ORL with respect to a $k^{th}$ output variable of Auto Associative Support Vector Regression (AASVR).

$$f_k(\theta) = w_k^{*T} \theta + b_k^* = \sum_{i=1}^{n} (\lambda_{k,i} - \lambda_{k,j}^*) \theta_i^T \theta + b_k^* \qquad <\text{Equation 29}>$$

The above mentioned descriptions are procedures for obtaining an optimized linear regression equation. If the result of nonlinearly mapping from primal data into a space of high-dimension is called a vector $\Phi(\bullet)$, a function of Equation 30 defined as an inner product of $\Phi(\bullet)$ is called as Kernel.

$$K(x_i, x_j) = \Phi(x_i)^T \Phi(x_j) \qquad <\text{Equation 30}>$$

When trying to find an ORL in a high dimension space, it is not necessary to know both of $\Phi(x_i)$ and $\Phi(x_j)$ but it is sufficient to know only the Kernel function $K(x_i, x_j)$. A Gaussian Radial Basis Function is used in this embodiment. When a Kernel function $K(\theta_i, \theta) = \Phi(\theta_i)^T \Phi(\theta)$ is used, the optimal nonlinear regression Equation can be obtained as following Equation 31.

$$f_k(\theta) = \sum_{i=1}^{n} (\lambda_{k,i} - \lambda_{k,j}^*) K(\theta_i, \theta) + b_k^* \qquad <\text{Equation 31}>$$

Here, a bias term can be calculated using arbitrary support vectors $\theta_r$ and $\theta_s$ through the following Equation 32.

$$b_k^* = -\frac{1}{2} \sum_{i=1}^{n} (\lambda_{k,i} - \lambda_{k,j}^*)[K(\theta_i, \theta_r) + K(\theta_i, \theta_s)] \qquad <\text{Equation 32}>$$

In relation to the obtained optimal nonlinear regression equation, if a constant E of a loss function, a penalty C of a dual objective function, and a Radial Basis Function (RBF) are used as a Kernel, it is preferable to provide a Kernel bandwidth a in advance. The total m number of SVR with respect to each output is obtained by repeating these processes and also AASVR of FIG. 3 can be constructed accordingly.

Calculating an optimal constant in operation S500 uses a response surface method to obtain optimal constants ($\epsilon$, C, and $\sigma$) of the SVR model that minimize prediction value errors of optimized data $Z_{op}$. The optimal constants can be obtained through the following steps.

Step A. The SVR model parameters $\sigma$, $\epsilon$, and C are designated as $v_1$, $v_2$, and $v_3$, respectively.

Step B. A search range with respect to each of $v_1$, $v_2$, and $v_3$ is defined. An appropriate search range can be obtained through a prior experience or a small scale preliminary experiment. In this embodiment, $v_1$=0.56486~1.63514, $v_2$=0.010534~0.010534, and $v_3$=2.1076~7.9933.

Step C. Upper limits and lower limits of the search range are designated as $U_1$, $U_2$, and $U_3$, and $L_1$, $L_2$, and $L_3$, respectively, and model parameters are normalized using the following Equation 33.

$$x_1 = \frac{v_1 - ((U_1 + L_1)/2)}{(U_1 - L_1)/2},$$
$$x_2 = \frac{v_2 - ((U_2 + L_2)/2)}{(U_2 - L_2)/2},$$
$$x_3 = \frac{v_3 - ((U_3 + L_3)/2)}{(U_3 - L_3)/2}$$

<Equation 33>

Figure 5:
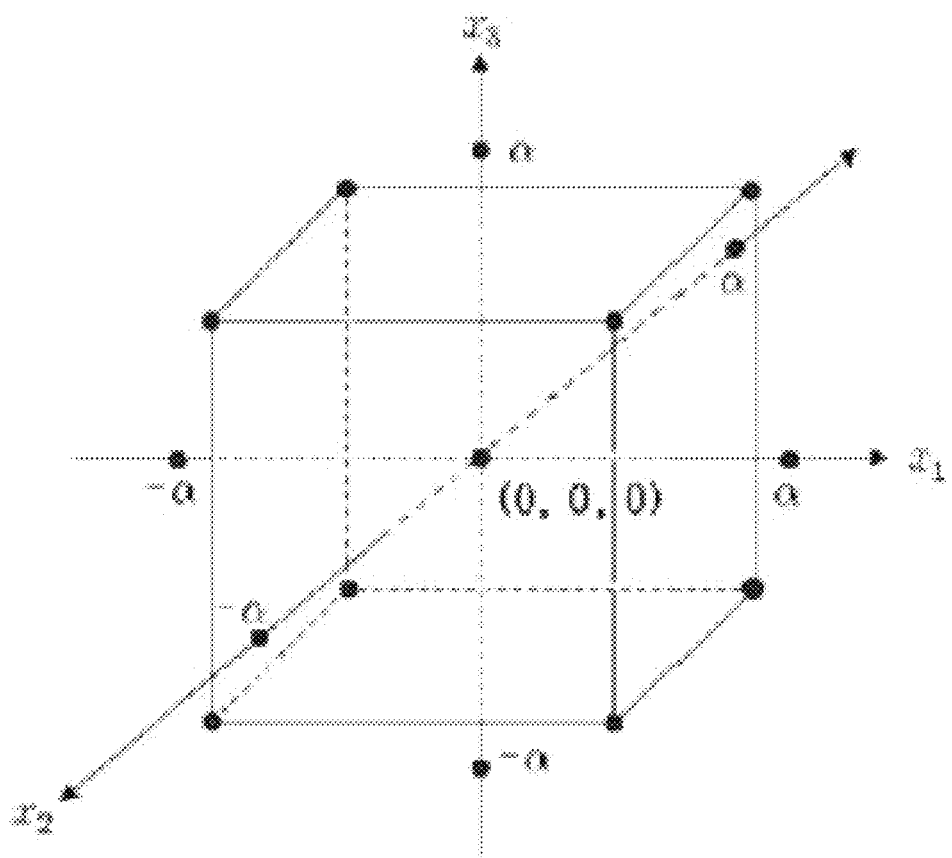
FIG. 5 illustrates an experimental point of a central composite design when the number of model parameters is three.

Step D. Experimental points, which are evaluation points of model performance, are determined by considering a search range of normalized model parameters $x_1$, $x_2$, and $x_3$. To determine the experimental points, a central composite design, which is one of statistical experiment plans, can be used. If the experimental points designated by the central composite design are represented with a three-dimensional space, it can be expressed as shown in FIG. 5.

Step E. The Experimental points by the central composite design include eight vertexes, one center point, and six axial points. In order to estimate the size of an experimental error, a repetition experiment can be performed approximately five times. Coordinates of an axial point is defined as $\alpha = 2^{3/4} = 1.68179$.

$\alpha$=[number of factor experimental points]$^{1/4}$  <Equation 34>

If the repetition experiment is performed five times at the center point, experimental points of $x_1$, $x_2$, and $x_3$ by the central composite design are shown in the following Table 2.

TABLE 2

| No | $X_1$ | $X_2$ | $X_3$ |
|---|---|---|---|
| 1 | −1 | −1 | −1 |
| 2 | 1 | −1 | −1 |
| 3 | −1 | 1 | −1 |
| 4 | 1 | 1 | −1 |
| 5 | −1 | −1 | 1 |
| 6 | 1 | −1 | 1 |
| 7 | −1 | 1 | 1 |
| 8 | 1 | 1 | 1 |
| 9 | −1.68179 | 0 | 0 |
| 10 | 1.68179 | 0 | 0 |
| 11 | 0 | −1.68179 | 0 |
| 12 | 0 | 1.68179 | 0 |
| 13 | 0 | 0 | −1.68179 |
| 14 | 0 | 0 | 1.68179 |
| 15 | 0 | 0 | 0 |
| 16 | 0 | 0 | 0 |
| 17 | 0 | 0 | 0 |
| 18 | 0 | 0 | 0 |
| 19 | 0 | 0 | 0 |

Step F. As shown in Table 2, values of the model parameters $v_1$, $v_2$, and $v_3$ are determined to obtain Table 3 (experimental points of $v_1$, $v_2$, and $v_3$ by a central composite design). These are values of model parameters that will be directly used to obtain a model.

TABLE 3

| No | $V_1$ | $V_2$ | $V_3$ |
|---|---|---|---|
| 1 | 0.564855 | 0.010534 | 2.1067 |
| 2 | 1.635144 | 0.010534 | 2.1067 |
| 3 | 0.564856 | 0.039967 | 2.1067 |
| 4 | 1.635144 | 0.039967 | 2.1067 |
| 5 | 0.564856 | 0.010534 | 7.9933 |
| 6 | 1.635144 | 0.010534 | 7.9933 |
| 7 | 0.564856 | 0.039967 | 7.9933 |
| 8 | 1.635144 | 0.039967 | 7.9933 |
| 9 | 0.2 | 0.02525 | 5.05 |
| 10 | 2 | 0.02525 | 5.05 |
| 11 | 1.1 | 0.0005 | 5.05 |
| 12 | 1.1 | 0.05 | 5.05 |
| 13 | 1.1 | 0.02525 | 0.1 |
| 14 | 1.1 | 0.02525 | 10 |
| 15 | 1.1 | 0.02525 | 5.05 |
| 16 | 1.1 | 0.02525 | 5.05 |
| 17 | 1.1 | 0.02525 | 5.05 |
| 18 | 1.1 | 0.02525 | 5.05 |
| 19 | 1.1 | 0.02525 | 5.05 |

Step G. At each experimental point of Table 3, a beta vector and a bias constant of a SVR model are obtained using $Z_{tr}$ and $P_{tr}$. For this, a data set $Z_{tr}$ is used. Actually, the same model is obtained from No. 15 to No. 19 corresponding to the center points.

Step H. A data set $P_{op}$ is inputted to the m number of AASVR in order to evaluate the accuracy of each model and then a normalized prediction value $\hat{Z}_{op}$ of optimization data is obtained. From this, an accuracy of an output model, which is MSE, is calculated through Equation 35. Since five center points have the same model, $P_{op}$ is divided into five and separate MSE calculation result is obtained from the divided sub data set.

$$MSE = \frac{1}{mn}\sum_{i=1}^{m}\sum_{j=1}^{n}(z_{ij} - \hat{z}_{ij})^2$$

<Equation 35>

Here, $z_{ij}$ is a $j^{th}$ input data of a sensor i among $P_{op}$. $\hat{Z}_{ij}$ is an estimation value by a model. The model is obtained using $P_{tr}$. An MSE calculation result by an experiment is shown in the following Table 4.

TABLE 4

| No | MSE | Log(MSE) |
|---|---|---|
| 1 | 0.000126 | −8.97923 |
| 2 | 0.000100 | −9.21034 |
| 3 | 0.000552 | −7.50196 |
| 4 | 0.000538 | −7.52765 |
| 5 | 0.000121 | −9.01972 |
| 6 | 0.000094 | −9.27222 |
| 7 | 0.000552 | −7.50196 |
| 8 | 0.000541 | −7.52209 |
| 9 | 0.001083 | −6.82802 |
| 10 | 0.000263 | −8.24336 |
| 11 | 0.000072 | −9.53884 |
| 12 | 0.000829 | −7.09529 |
| 13 | 0.000542 | −7.52024 |
| 14 | 0.000265 | −8.23578 |
| 15 | 0.000221 | −8.41735 |
| 16 | 0.000204 | −8.49739 |
| 17 | 0.000265 | −8.23578 |
| 18 | 0.000294 | −8.13193 |
| 19 | 0.000194 | −8.54765 |

Step I. When obtaining response surface, log(MSE) instead of MSE is used. Considering this, response surface between the model parameters x1, x2, and x3 and log(MSE) is estimated. The response surface is assumed with a two-dimensional model like the following Equation 36.

$$\log(MSE)=\beta_0+\beta_1 x_1+\beta_2 x_2+\beta_3 x_3+\beta_{11} x_1^2+\beta_{22} x_2^2+\beta_{33} x_3^2+\beta_{12} x_1 x_2+\beta_{13} x_1 x_3+\beta_{23} x_2 x_3+e \qquad \text{<Equation 36>}$$

where e is a random error.

The response surface estimated in this embodiment is as below.

$$\log(MSE)=-8.3492 b_0-0.2131 x_1-0.7716 x_2-0.0952 x_3-0.2010 x_1^2-0.0753 x_2^2+0.0799 x_3^2$$

Step J. Optimized conditions of log(MSE), $v_1$, $v_2$, and $v_3$ that minimize e are obtained using an estimated response surface. Since the two-dimensional response surface is assumed, the optimized condition is confirmed through partial derivative. This is, $x_1$, $x_2$, and $x_3$ satisfying the following Equation 35 are obtained.

$$\frac{\partial \log(MSE)}{\partial x_1} = 0, \qquad \text{<Equation 37>}$$
$$\frac{\partial \log(MSE)}{\partial x_2} = 0,$$
$$\frac{\partial \log(MSE)}{\partial x_3} = 0$$

Regarding the response surface obtained through this embodiment, the optimized condition is $(x^*_1, x^*_2, \text{ and } x^*_3)= (1.5438, -0.6818, 1.5929)$.

Step K. The optimized condition $x^*_1$, $x^*_2$, and $x^*_3$ is converted into an original unit using the following Equation 38.

$$v_1 = \left(\frac{U_1-L_1}{2}\right) x_1 + \left(\frac{U_1+L_1}{2}\right), \quad v_2 \qquad \text{<Equation 38>}$$
$$= \left(\frac{U_2-L_2}{2}\right) x_2 + \left(\frac{U_2+L_2}{2}\right), \quad v_3$$
$$= \left(\frac{U_3-L_3}{2}\right) x_3 + \left(\frac{U_3+L_3}{2}\right)$$

According to this embodiment, $v^*_1=1.3910=\rho^*$, $v^*_2=0.0005=\epsilon^*$, $v^*_3=6.7951=C^*$. Since the predicted log (MSE) under this condition is −9.9446, if this is taken with an exponent and then converted into MSE, it becomes 0.000048.

Figure 3:
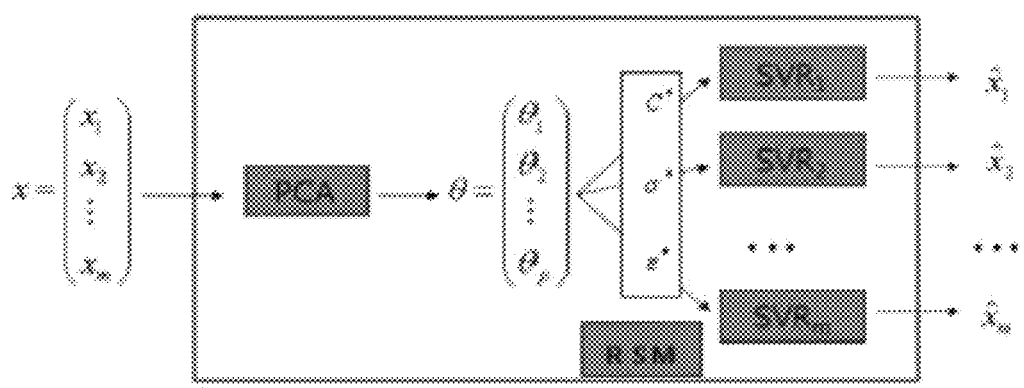
FIG. 3 illustrates a Support Vector Regression (SVR) model generated based on a prediction method for monitoring performance of power plant instruments according to one embodiment of the present invention.

Generating the SVR training model in operation S600 receives the three optimal constants $\epsilon^*$, $C^*$, and $\sigma^*$, principal components $P_{tr}$ of training data obtained from operation S500, and training data of a first signal (a first column of $Z_{tr}$), and then solves an optimization equation using a quadratic equation. Then, the generating of the SVR training model in operation S600 obtains $\beta_1(n\times 1)$, which is a difference of Lagrangian multipliers, and a bias constant $b_1$ to generate a model of SVR1 as shown in FIG. 3. Through the same method, the above procedure is repeated on second to $m^{th}$ sensors to obtain $\beta_2, \beta_3, \ldots, \beta_m$, and $b_2, b_3, \ldots, b_m$, such that a model of $SVR_m$ is generated from $SVR_2$ to $SVR_m$ so as to construct the SVR model with respect to an entire sensor as shown in FIG. 3.

Predicting an output of a training model in operation S700 uses the principal component $P_{tr}$ of training data and the principal component $P_{ts}$ of test data to obtain a Kernel function matrix $K(n\times n)$ of Gaussian Radial Basis Function. Then, the predicting of an output of a training model in operation S700 uses $\beta_1$, which is a difference of Lagrangian multiplier of SVR model obtained from operation S600, and a bias constant $b_1$ to generate an output of $SVR_1$. Through the same method, the above procedure is repeated on second to $m^{th}$ sensors to obtain a model prediction value, that is, an output of $SVR_m$ from $SVR_2$.

This is represented by the following Equation 39.

$$\hat{Z}_{B1} = K \times \beta_1 + b_1 \qquad \text{< Equation 39 >}$$
$$\hat{Z}_{B2} = K \times \beta_2 + b_2$$
$$\vdots$$
$$\hat{Z}_{Bm} = K \times \beta_m + b_m$$

Performing de-normalization in operation S800 denormalizes the prediction value of the normalized experimental data obtained in operation S700 into an original range so as to obtain a prediction value for each sensor of an original scale. This is represented by the following Equation 40.

$$\hat{X}_{B1} = \hat{Z}_{B1}\{\max(X_{B1}) - \min(X_{B1})\} + \min(X_{B1})$$
$$\hat{X}_{B2} = \hat{Z}_{B2}\{\max(X_{B2}) - \min(X_{B2})\} + \min(X_{B2})$$
$$\vdots \qquad \vdots$$
$$\hat{X}_{Bm} = \hat{Z}_{Bm}\{\max(X_{Bm}) - \min(X_{Bm})\} + \min(X_{Bm})$$

In order to confirm excellence of the prediction method for monitoring performance of plant instruments according to one embodiment of the present invention, the prediction method is compared to existing methods by using instrument signal data, which are measured from the first and second loops of nuclear power plant during the startup period. The data used for analysis are values measured by a total of 11 sensors.

Table 5 illustrates accuracy comparison of a prediction value between a conventional Kernel regression method and a method for monitoring a plant instrument according to one embodiment of the present invention.

TABLE 5

| Measurement Signal Number | Measurement Objects | Mean Square Error of Conventional Method | Mean Square Error of New Method | Accuracy Improvement Rate (%) |
|---|---|---|---|---|
| 1 | Reactor Power | 0.6460 | 0.1020 | 84.19 |
| 2 | Pressurizer Water Level | 0.4160 | 0.1155 | 72.23 |
| 3 | Steam Generator's Steam Flow | 0.0004 | 0.0001 | 81.21 |
| 4 | Steam Generator's Narrow Range Water Level | 0.1303 | 0.0683 | 47.57 |
| 5 | Steam Generator's Steam Pressure | 0.0548 | 0.0178 | 67.60 |
| 6 | Steam Generator's Wide Range Water Level | 0.0269 | 0.0038 | 85.83 |
| 7 | Steam Generator's Main Feed Flow | 0.0003 | 0.0001 | 58.55 |
| 8 | Turbine Power | 71.0406 | 15.2597 | 78.52 |
| 9 | Reactor Coolant Charging Flow | 0.0234 | 0.0025 | 89.19 |
| 10 | Residual Heat Removing Flow | 0.0389 | 0.0067 | 95.17 |
| 11 | Reactor Coolant Temperature | 0.1755 | 0.0542 | 69.15 |

Data used for analysis of FIG. 5 are the following values measured by a total of 11 sensors.
1. Reactor power output (%)
2. Pressurizer level (%)
3. Steam generator's steam flow (Mkg/hr)
4. Steam generator's narrow range water level data (%)
5. Steam generator's steam pressure data (kg/cm2)
6. Steam generator's wide range water level data (%)
7. Steam generator's main feed flow data (Mkg/hr) Turbine power data (MWe)
9. Reactor coolant charging flow data (m3/hr)
10. Residual heat removing flow data (m3/hr)
11. Reactor coolant temperature data (° C.)

If the data are used to draw a graph with a time function, the graphs are FIGS. 6A through 16B.

Figure 6A:
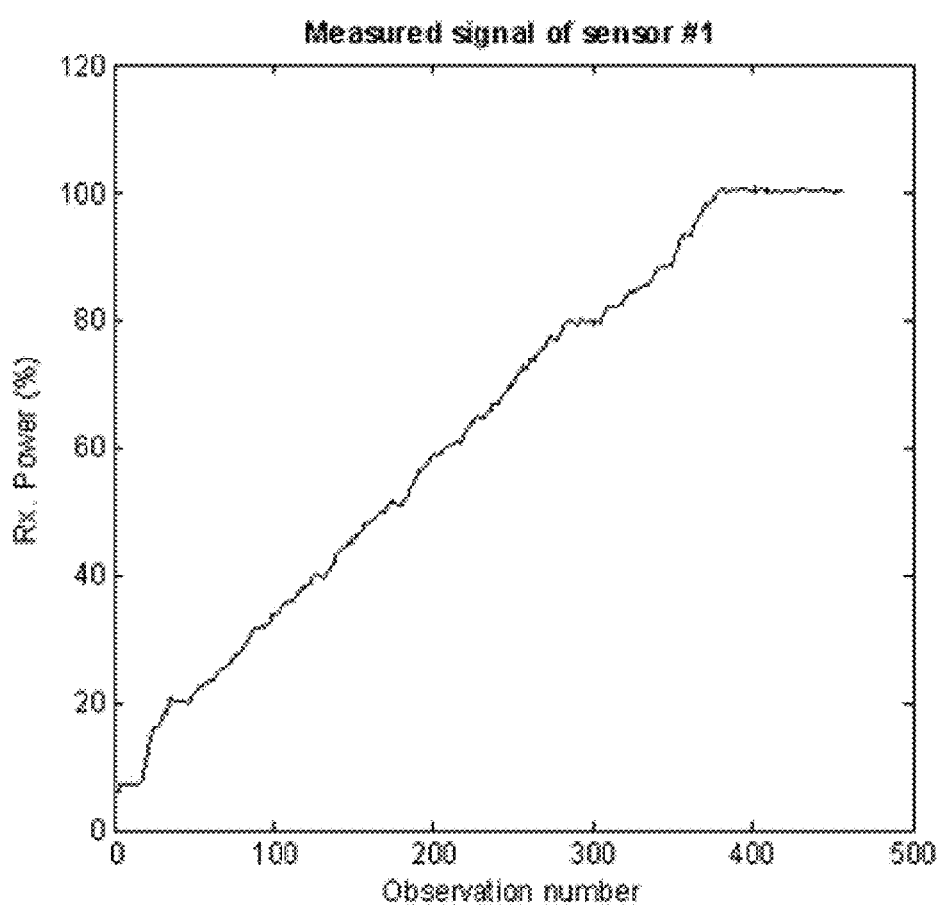
FIGS. 6A and 6B illustrate reactor core power data in a nuclear power plant in order to test accuracy according to one embodiment of the present invention.
Figure 6B:
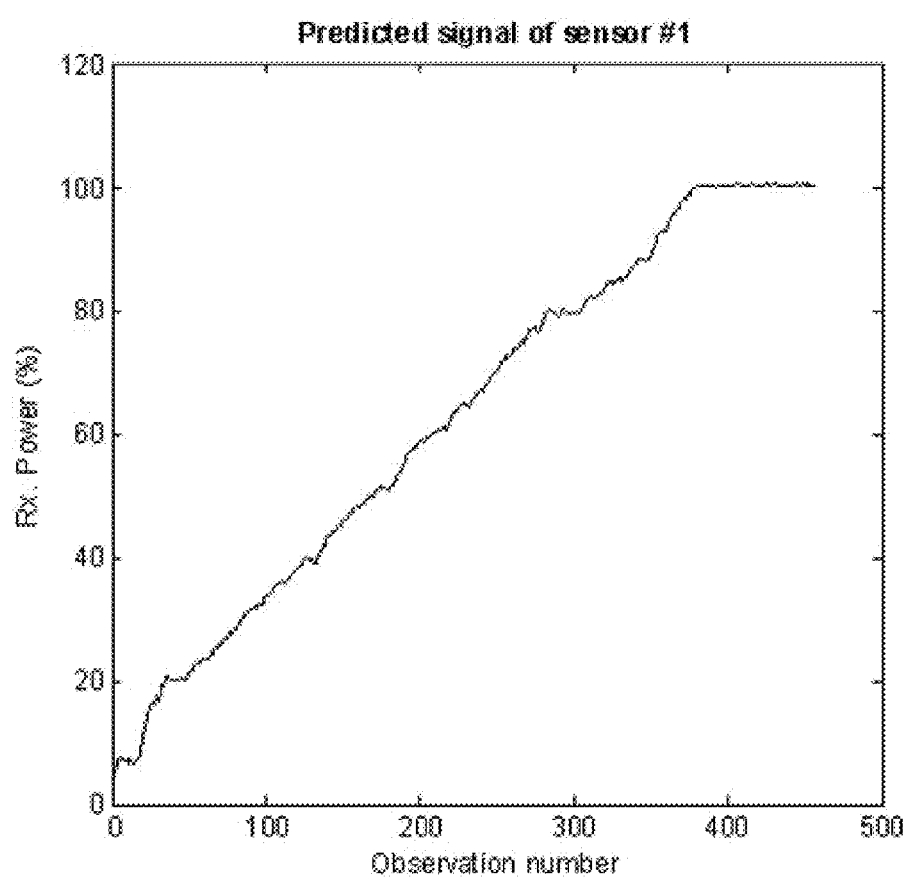

FIGS. 6A and 6B illustrate reactor core power data in a nuclear power plant. FIG. 6A represents test input data of Equation $6X_{ts1}$. FIG. 6B represents predicted data $\hat{X}_{ts1}$ using the algorithm according to embodiments with respect to test input data of Equation 40.

Figure 7A:
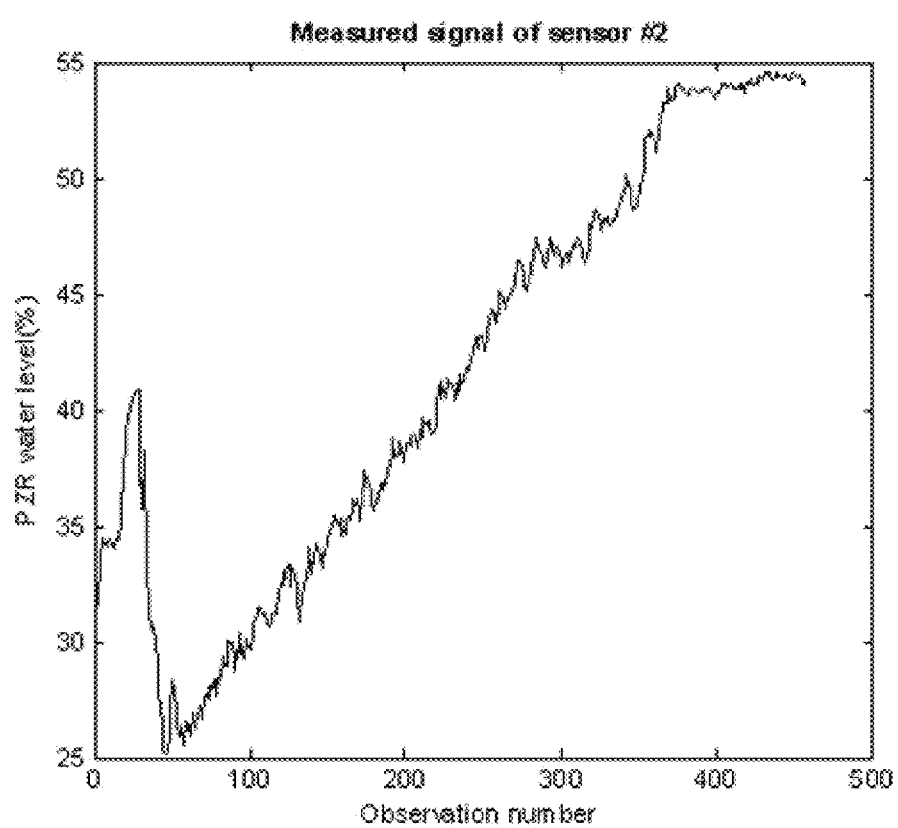
FIGS. 7A and 7B illustrate pressurizer level data in a nuclear power plant in order to test accuracy according to one embodiment of the present invention.
Figure 7B:
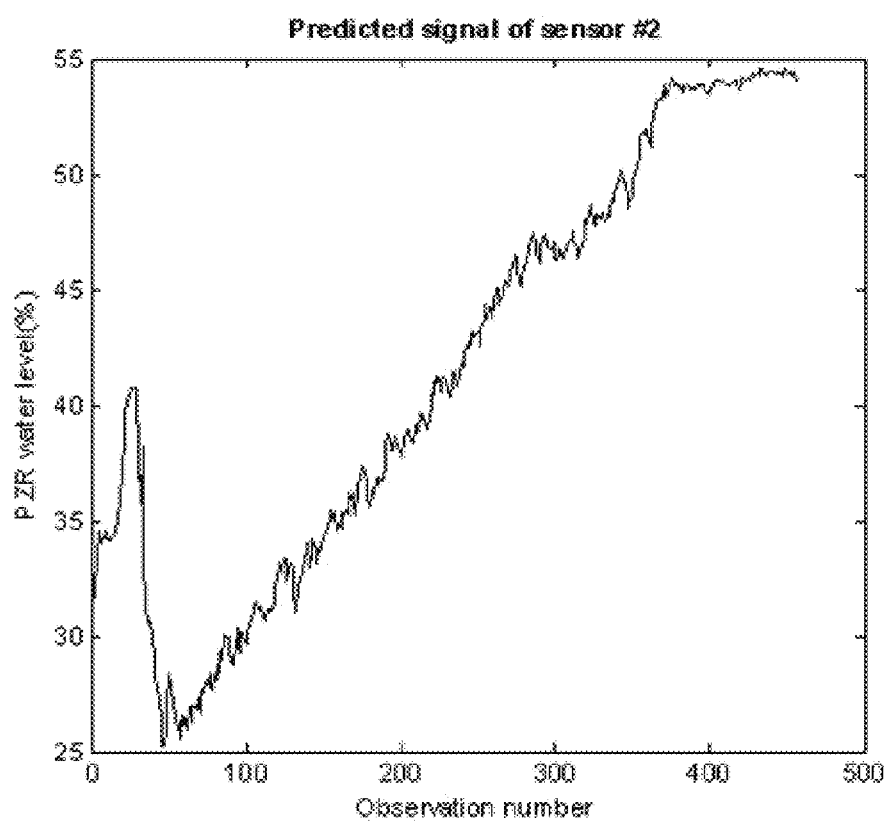

FIGS. 7A and 7B illustrate pressurizer level data in a nuclear power plant in order to test accuracy according to one embodiment of the present invention. FIG. 7A represents test input data of Equation $6X_{ts2}$. FIG. 7B represents estimated data $\hat{X}_{ts2}$ predicted using the algorithm according to embodiments with respect to test input data of Equation 40.

Figure 8A:
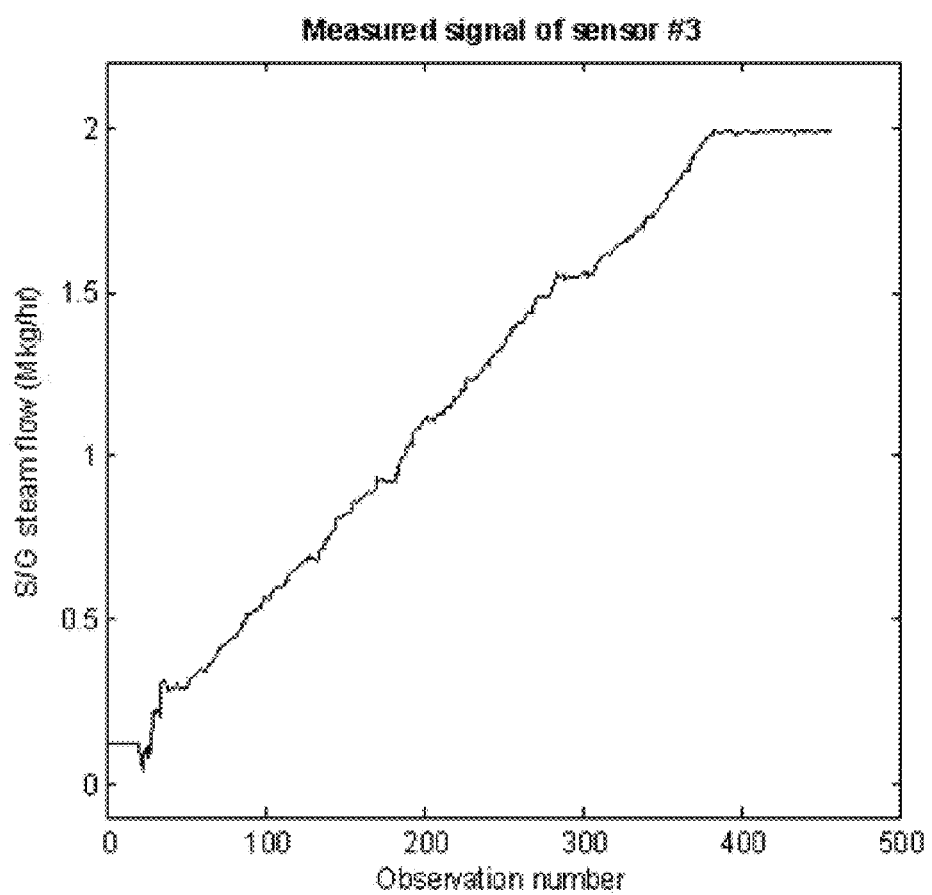
FIGS. 8A and 8B illustrate a steam generator's steam flow data in a nuclear power plant in order to test accuracy according to one embodiment of the present invention.
Figure 8B:
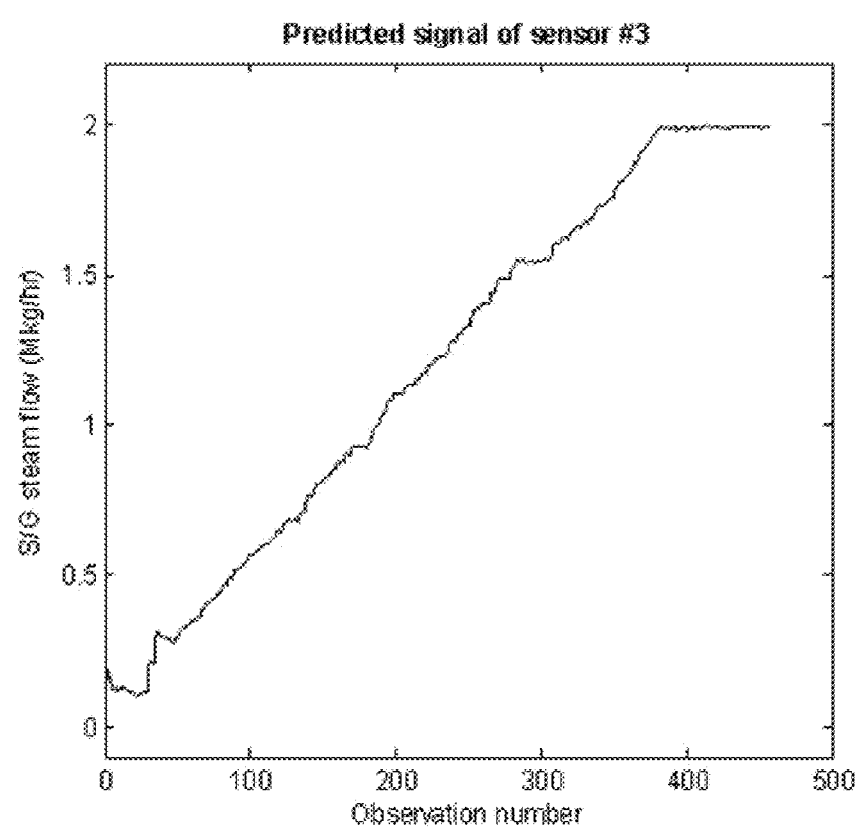

FIGS. 8A and 8B illustrate a steam generator's steam flow data in a nuclear power plant in order to test accuracy according to one embodiment of the present invention. FIG. 8A represents test input data $X_{ts3}$ of Equation 6. FIG. 8B represents estimated data $\hat{X}_{ts3}$ predicted using the algorithm according to embodiments with respect to teat input data of Equation 40.

Figure 9A:
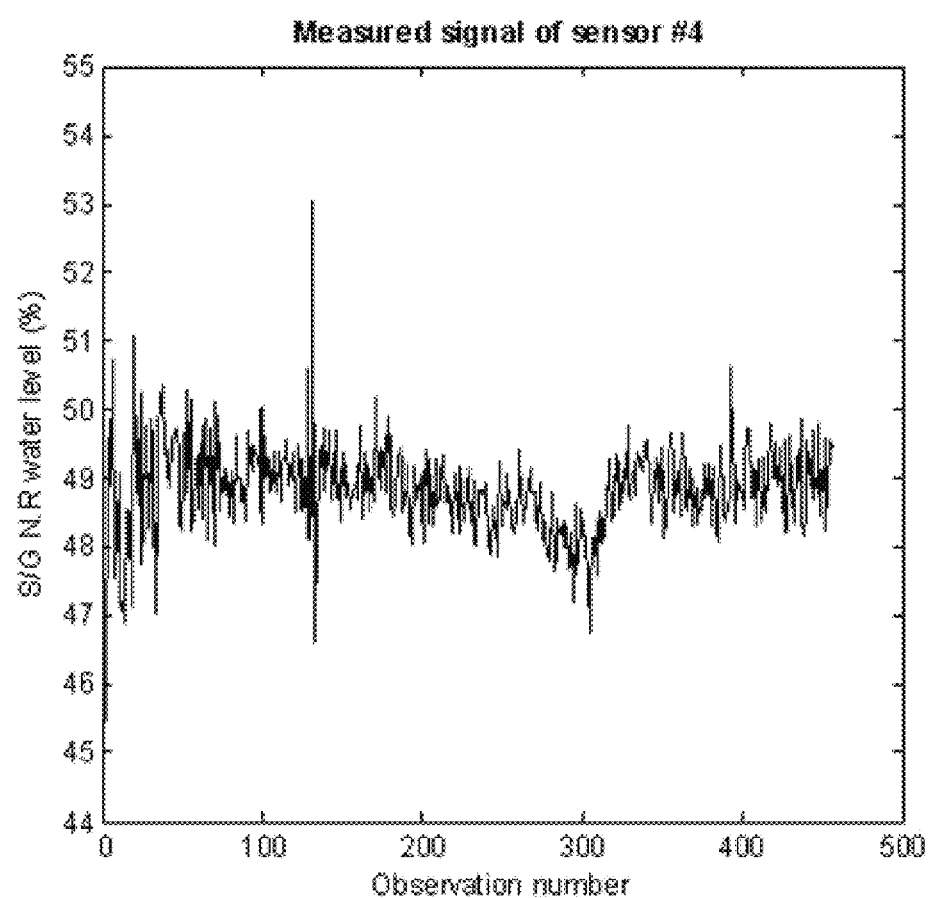
FIGS. 9A and 9B illustrate a steam generator's narrow range level data in a nuclear power plant in order to test accuracy according to one embodiment of the present invention.
Figure 9B:
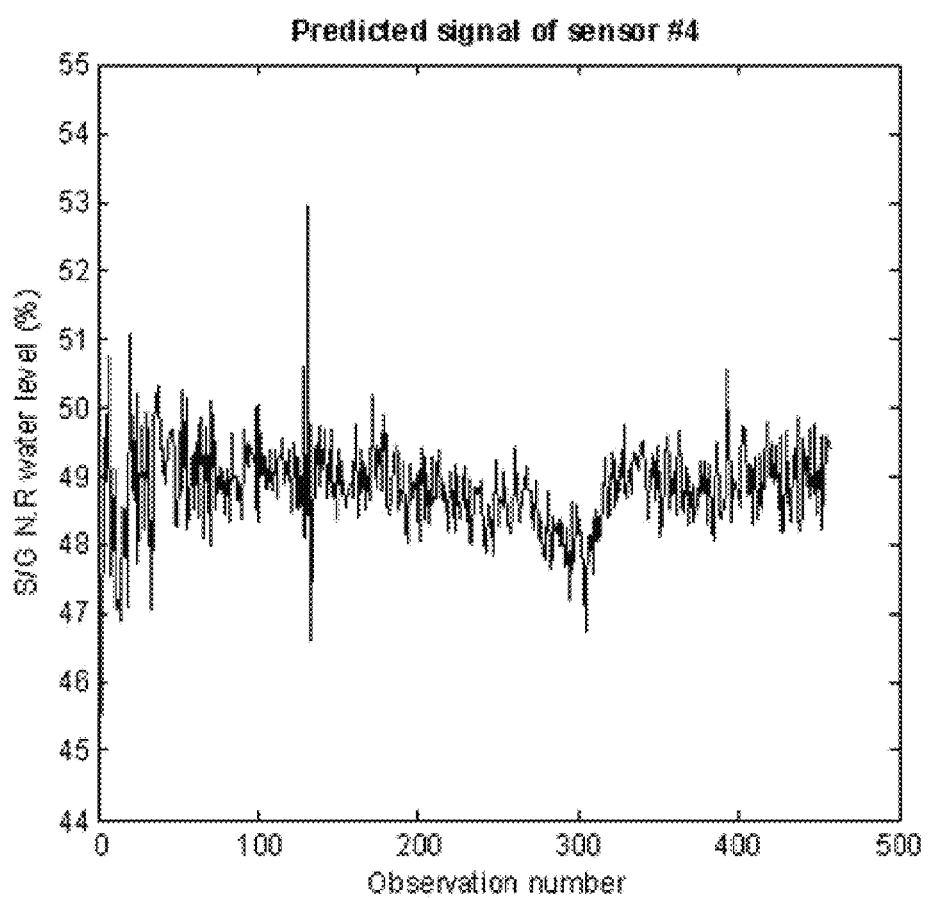

FIGS. 9A and 9B illustrate a steam generator's narrow range water level data in a nuclear power plant in order to test accuracy according to one embodiment of the present invention. FIG. 9A represents test input data $X_{ts4}$ of Equation 6. FIG. 9B represents estimated data $\hat{X}_{ts4}$ predicted using the algorithm according to embodiments with respect to test input data of Equation 40.

Figure 10A:
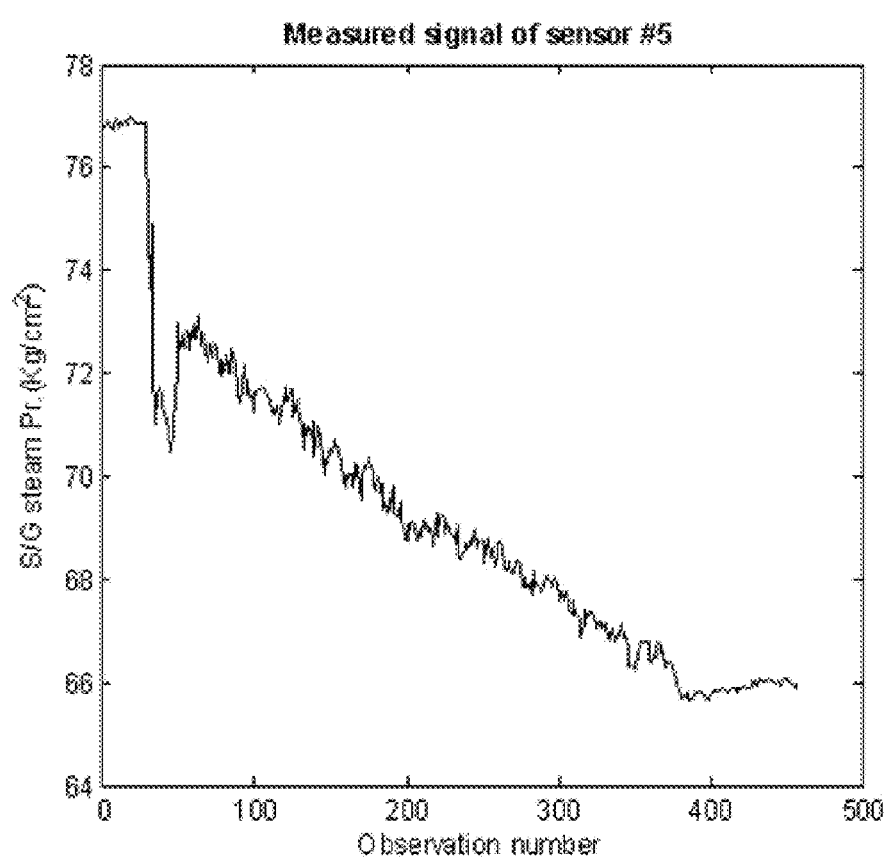
FIGS. 10A and 10B illustrate a steam generator's pressure data in a nuclear power plant in order to test accuracy according to one embodiment of the present invention.
Figure 10B:
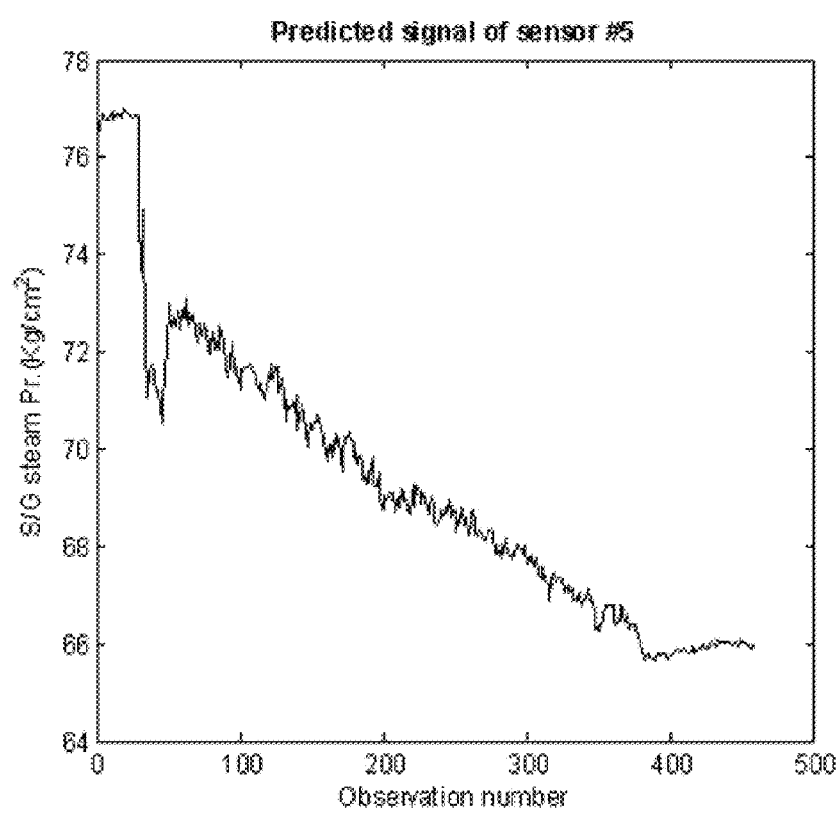

FIGS. 10A and 10B illustrate a steam generator's steam pressure data in a nuclear power plant in order to test accuracy according to one embodiment of the present invention. FIG. 10A represents test input data $X_{ts5}$ of Equation 6. FIG. 10B represents estimated data $\hat{X}_{ts5}$ predicted using the algorithm according to embodiments with respect to test input data of Equation 40.

Figure 11A:
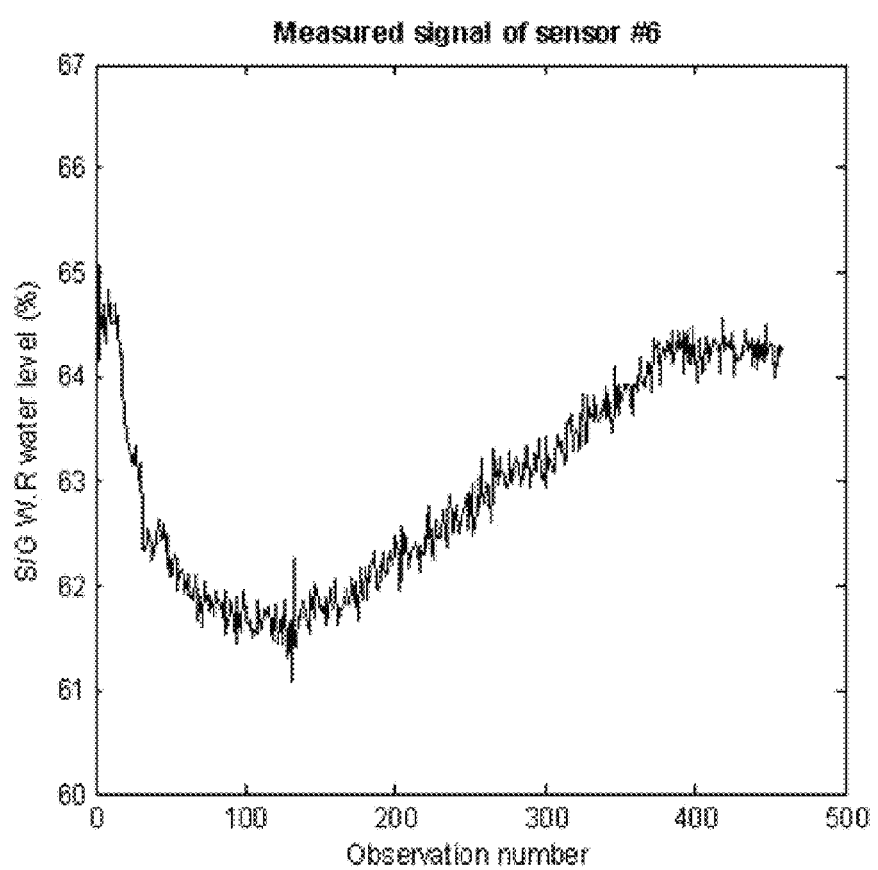
FIGS. 11A and 11B illustrate a steam generator's wide range level data in a nuclear power plant in order to test accuracy according to one embodiment of the present invention.
Figure 11B:
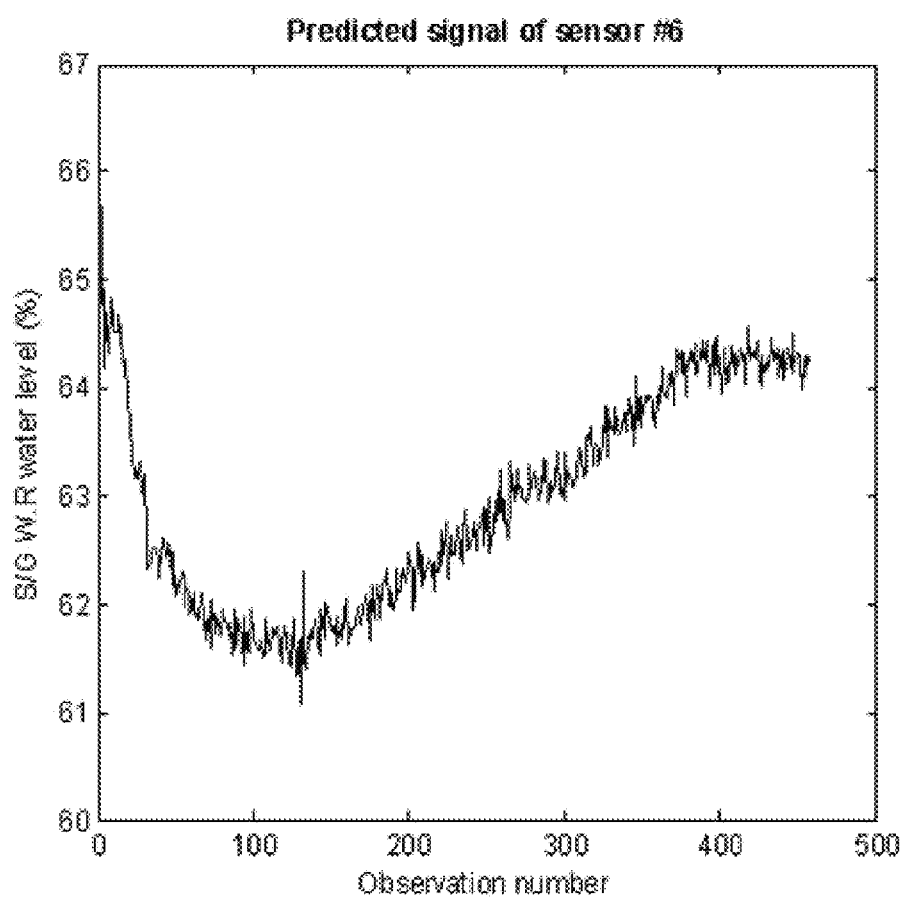

FIGS. 11A and 11B illustrate a steam generator's wide range water level data in a nuclear power plant in order to test accuracy according to one embodiment of the present invention. FIG. 11A represents test input data $X_{ts6}$ of Equation 6. FIG. 11B represents estimated data $\hat{X}_{ts6}$ predicted using the algorithm according to embodiments with respect to test input data of Equation 40.

Figure 12A:
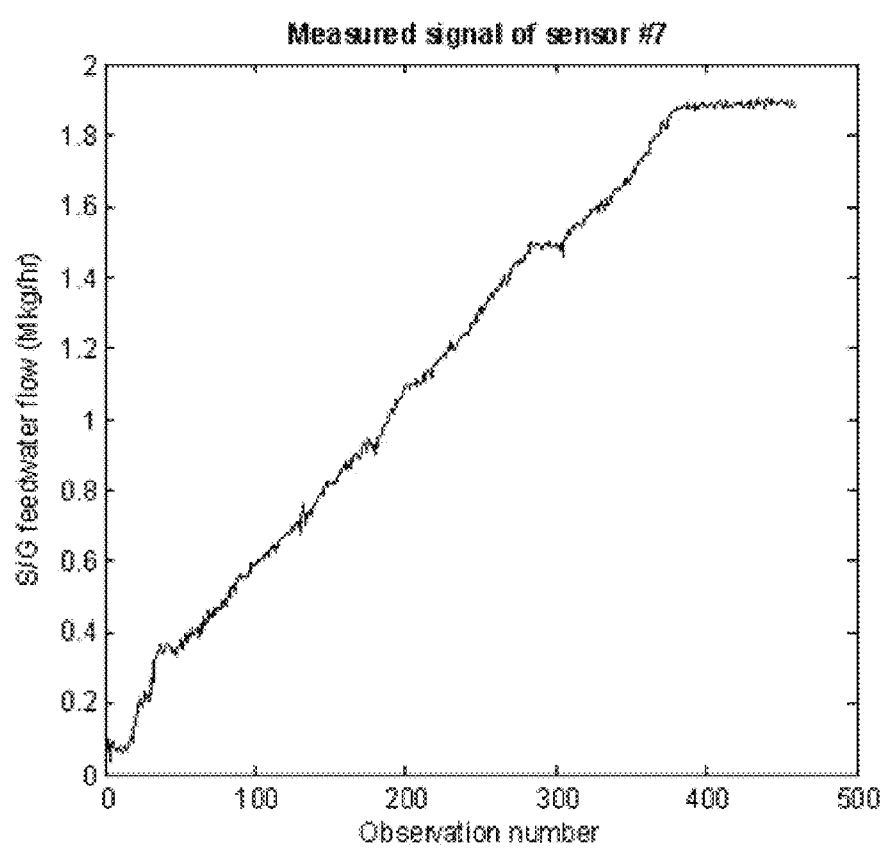
FIGS. 12A and 12B illustrates a steam generator's main feed flow data in a nuclear power plant in order to test accuracy according to one embodiment of the present invention.
Figure 12B:
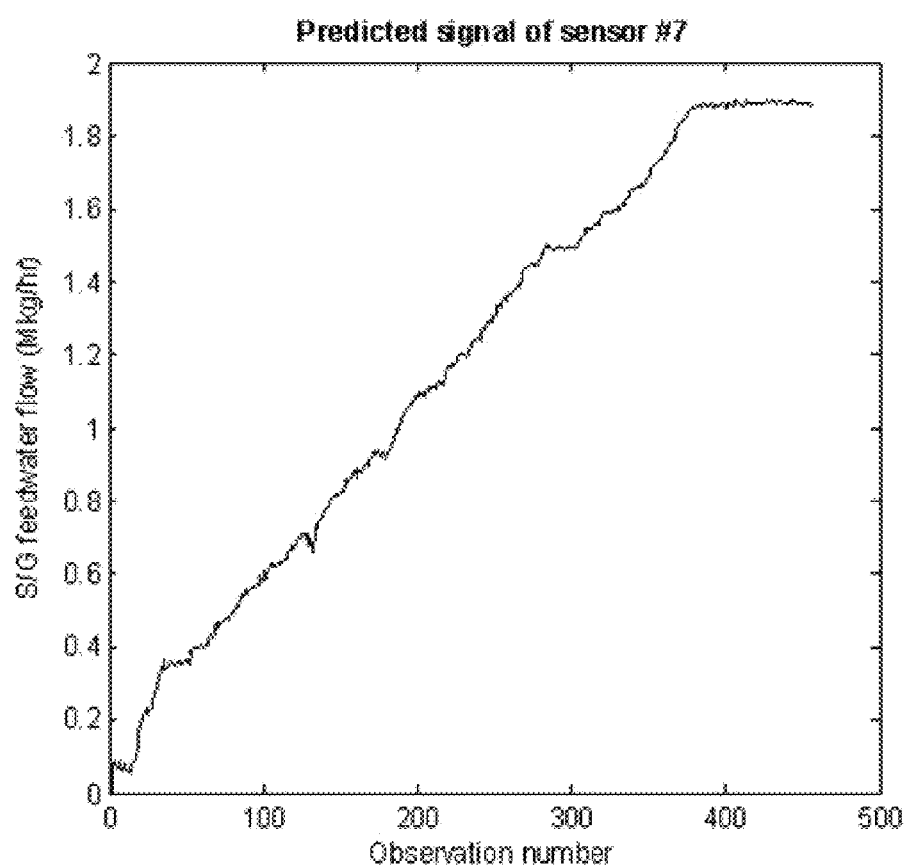

FIGS. 12A and 12B illustrate a steam generator's main feed flow data in a nuclear power plant in order to test accuracy according to one embodiment of the present invention. FIG. 12A represents test input data $X_{ts7}$ of Equation 6. FIG. 12B represents estimated data $\hat{X}_{ts7}$ predicted using the algorithm according to embodiments with respect to test input data of Equation 40.

Figure 13A:
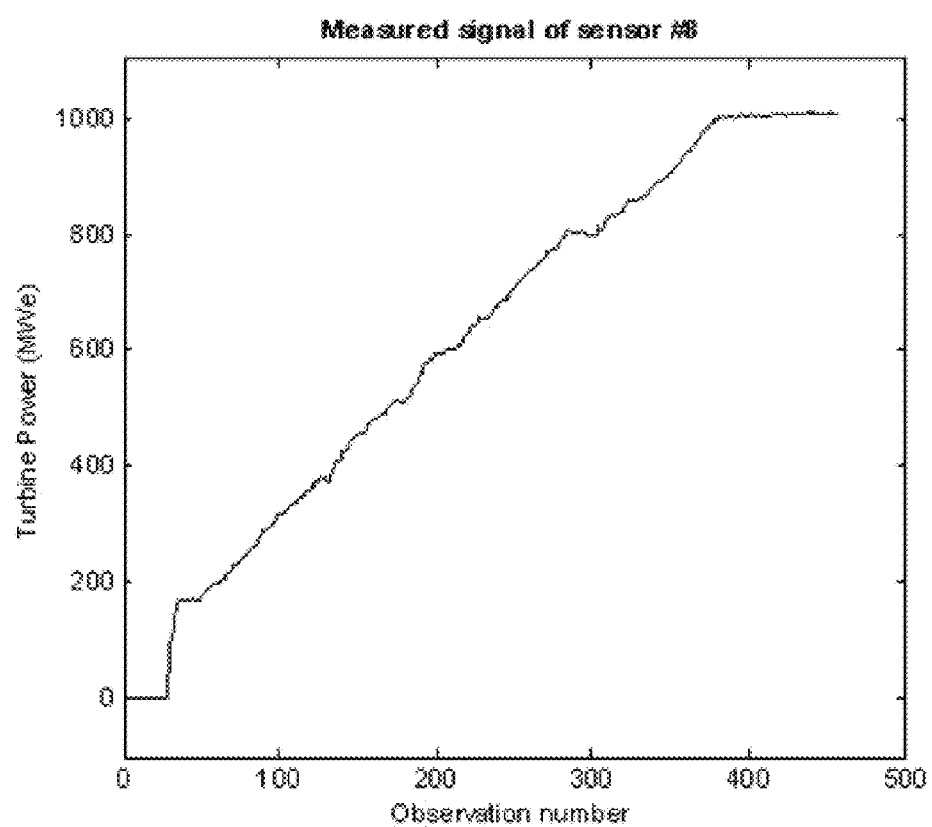
FIGS. 13A and 13B illustrates turbine output data in a nuclear power plant in order to test accuracy according to one embodiment of the present invention.
Figure 13B:
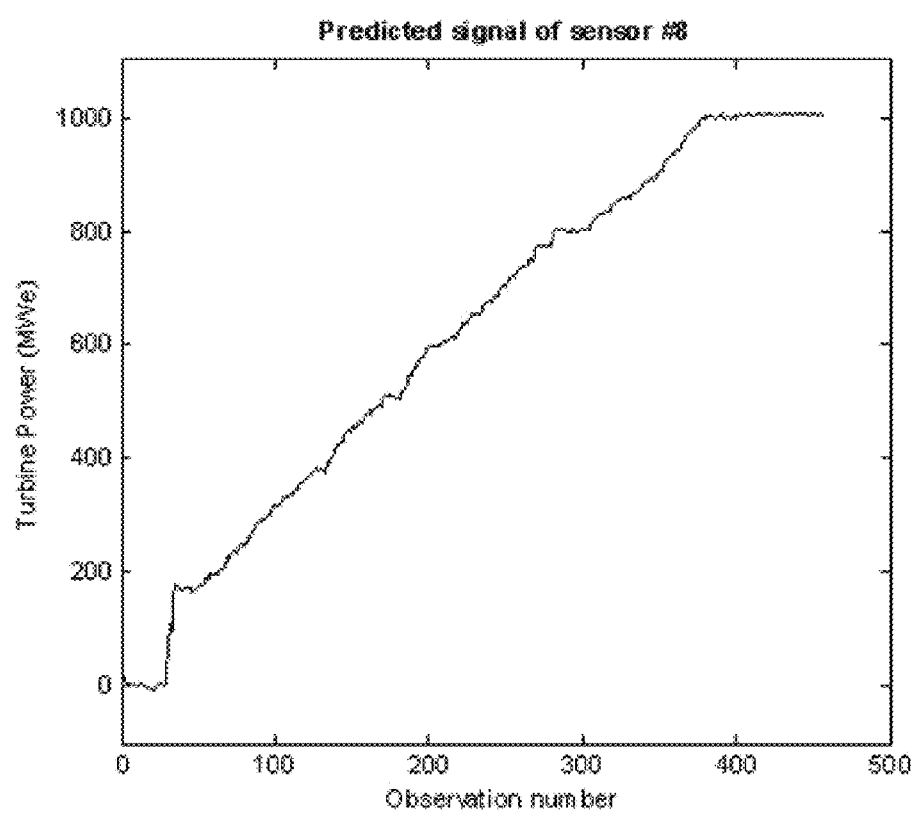

FIGS. 13A and 13B illustrate turbine power data in a nuclear power plant in order to test accuracy according to one embodiment of the present invention. FIG. 13A represents test input data $X_{ts8}$ of Equation 6. FIG. 13B represents estimated data $\hat{X}_{ts8}$ predicted using the algorithm according to embodiments with respect to test input data of Equation 40.

Figure 14A:
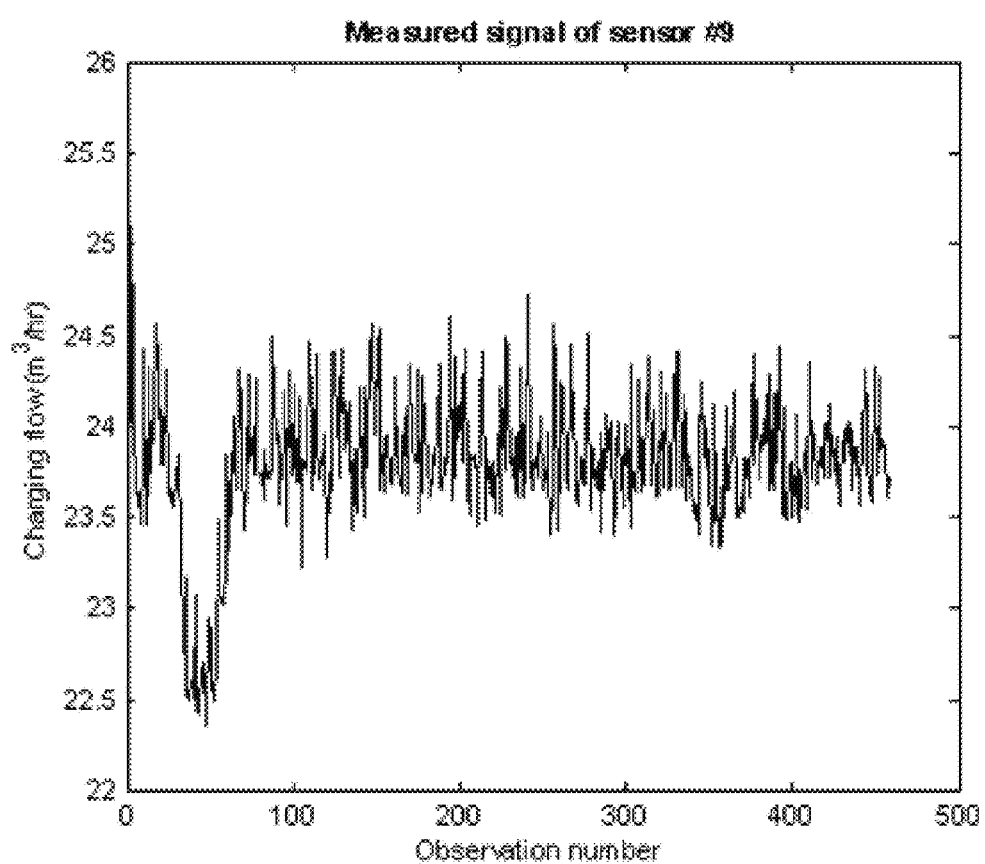
FIGS. 14A and 14B illustrate first loop charging flow data in a nuclear power plant in order to test accuracy according to one embodiment of the present invention.
Figure 14B:
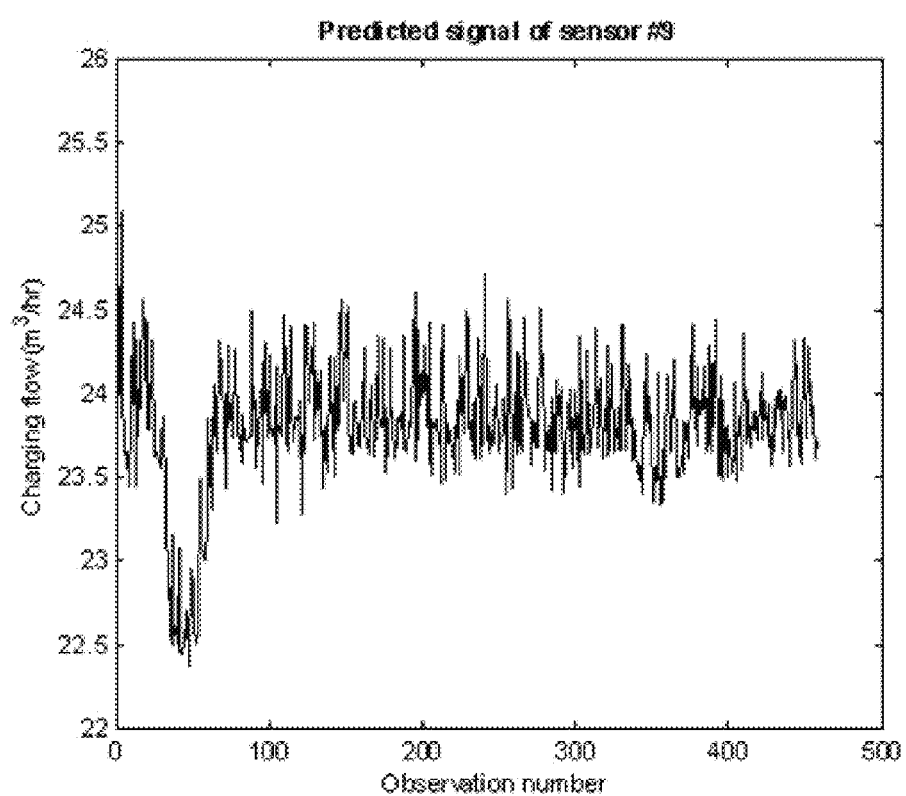

FIGS. 14A and 14B illustrate reactor coolant charging flow data in a nuclear power plant in order to test accuracy according to one embodiment of the present invention. FIG. 14A represents test input data $X_{ts9}$ of Equation 6. FIG. 14B represents estimated data $\hat{X}_{ts9}$ predicted using the algorithm according to embodiments with respect to test input data of Equation 40.

Figure 15A:
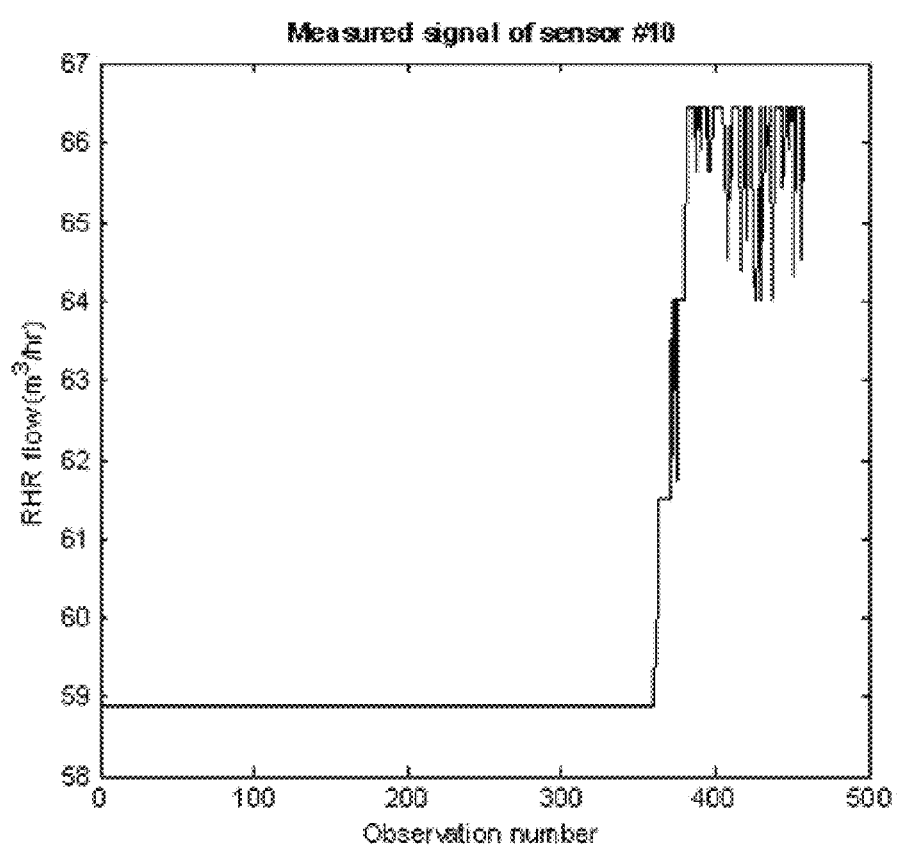
FIGS. 15A and 15B illustrate residual heat removing flow data in a nuclear power plant in order to test accuracy according to one embodiment of the present invention.
Figure 15B:
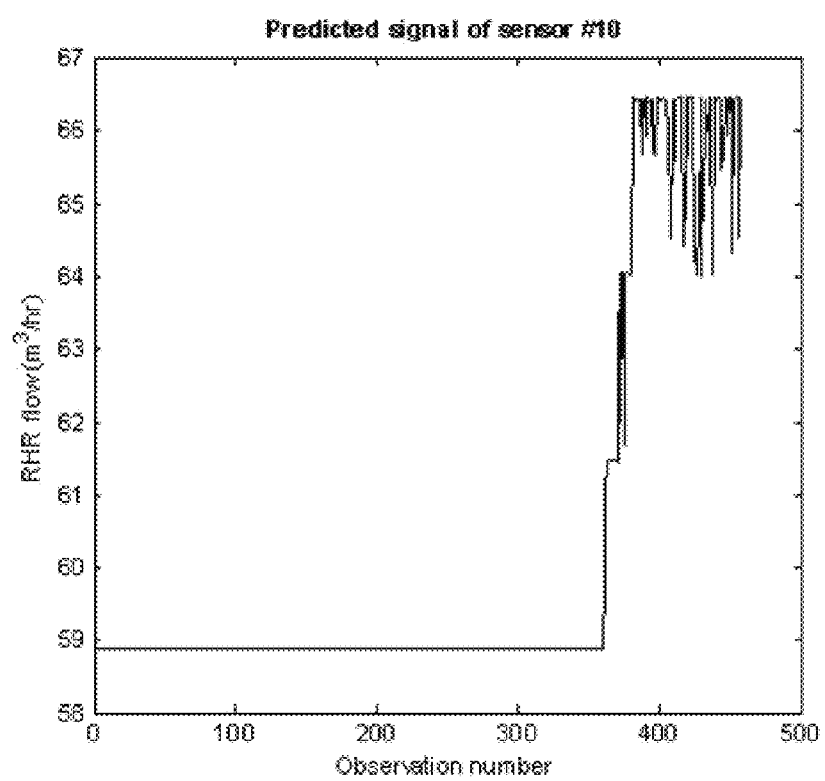

FIGS. 15A and 15B illustrate residual heat removing flow data in a nuclear power plant in order to test accuracy according to one embodiment of the present invention. FIG. 15A represents test input data $X_{ts10}$ of Equation 6. FIG. 15B represents estimated data $\hat{X}_{ts10}$ predicted using the algorithm according to embodiments with respect to test input data of Equation 40.

Figure 16A:
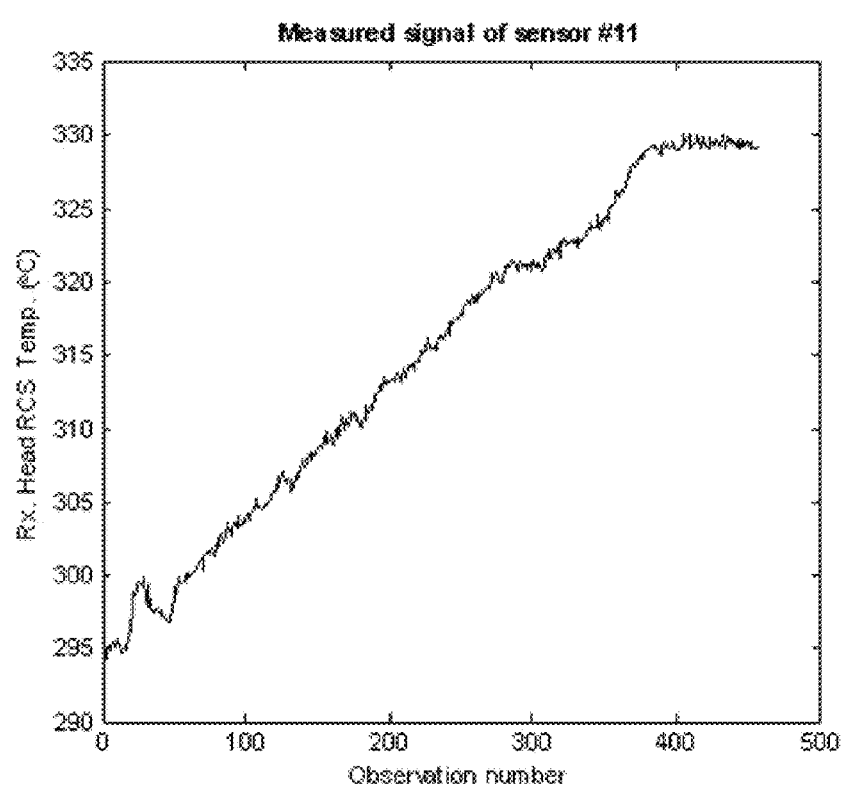
FIGS. 16A and 16B illustrate reactor top coolant temperature data in a nuclear power plant in order to test accuracy according to one embodiment of the present invention.
Figure 16B:
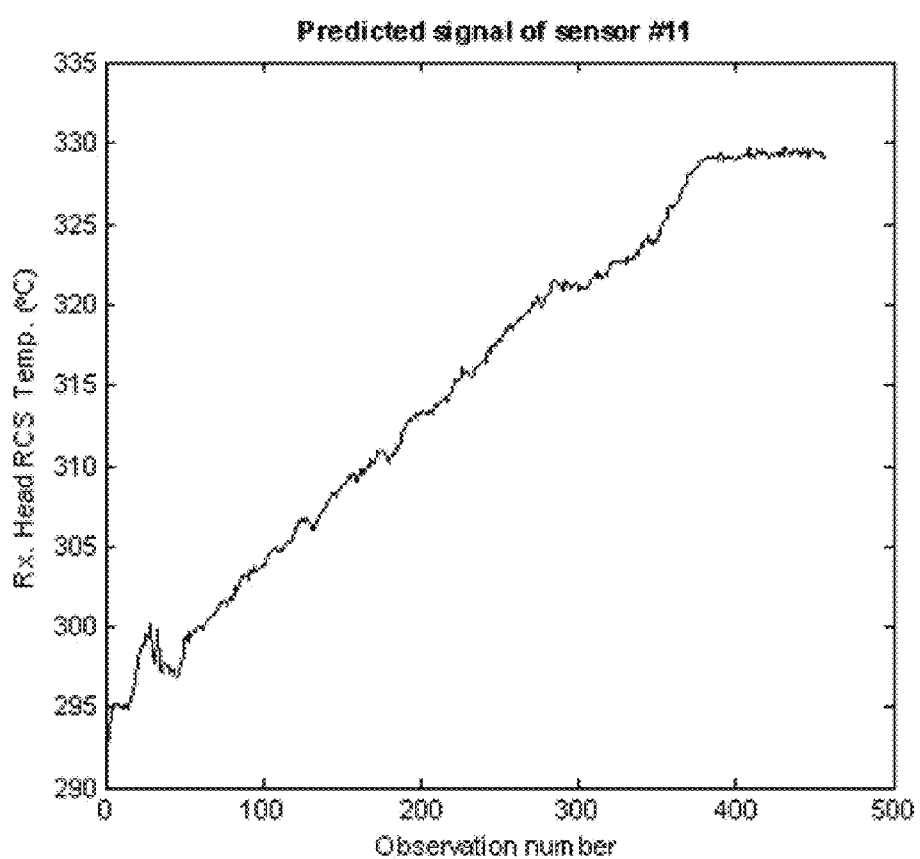

FIGS. 16A and 16B illustrate reactor coolant temperature data in a nuclear power plant in order to test accuracy according to one embodiment of the present invention. FIG. 16A represents test input data $X_{ts11}$ of Equation 6. FIG. 16B represents estimated data X predicted using the algorithm according to embodiments with respect to test input data of Equation 40.

In Table 5, accuracy is the most basic barometer when a prediction model is applied to operational monitoring. The accuracy is commonly represented with a mean square error of a model prediction value and an actual measurement value.

Equation 41 represents accuracy about one instrument.

$$A = \frac{1}{N}\sum_{i=1}^{N}(\hat{x}_i - x_i)^2 \qquad <\text{Equation 41}>$$

where N is the number of experimental data, $\hat{x}_i$ is an estimation value of the model of $i^{th}$ experimental data, and $x_i$ is a measurement value of $i^{th}$ experimental data.

The prediction method for monitoring performance of plant instruments according to one embodiment of the present invention extracts a principal component of an instrument signal, obtains an optimized constant of a SVR model through a response surface methodology using data for optimization, and trains a model using training data. Therefore, compared to an existing Kernel regression method, accuracy for calculating a prediction value can be improved.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A prediction method for monitoring performance of power plant instruments, comprising:
    displaying measurement data in a matrix;
    normalizing the measurement data into a normalized measurement data set;
    trisecting the normalized measurement data set into three data sets, wherein the three trisected data sets comprising a normalized training data set, a normalized optimization data set, and a normalized test data set;
    extracting principal components of each of the three trisected data sets;
    calculating an optimal constant of a Support Vector Regression (SVR) model, based on the normalized measurement data set and the extracted principal components thereof, to optimize prediction value errors of data for optimization with a response surface method;

generating the SVR training model with the optimal constant;

obtaining a Kernel function matrix with the normalized test data set as an input and predicting an output value of the SVR training model; and de-normalizing the output value into an original range to obtain a predicted value of a variable, wherein the displaying of the measurement data in the matrix is represented by the following equation:

$$X = \begin{bmatrix} X_{1,1} & X_{1,2} & \ldots & X_{1,m} \\ X_{2,1} & X_{2,2} & \ldots & X_{2,m} \\ \vdots & \vdots & \ddots & M \\ X_{3n,1} & X_{3n,2} & \ldots & X_{3n,m} \end{bmatrix} = \begin{bmatrix} X_1 & X_2 & \ldots & X_m \end{bmatrix}$$

$$X_{ts} = [X_{3i+1,1} \ X_{3i+1,2} \ \ldots, X_{3i+1,m}] = [X_{ts1} \ X_{ts2} \ \ldots \ X_{tsm}]$$

$$X_{tr} = [X_{3i+2,1} \ X_{3i+2,2} \ \ldots, X_{3i+2,m}] = [X_{tr1} \ X_{tr2} \ \ldots \ X_{trm}]$$

$$X_{op} = [X_{3i+1,1} \ X_{3i+1,2} \ \ldots, X_{3i+3,m}] = [X_{op1} \ X_{op2} \ \ldots \ X_{opm}]$$

where:
X is a matrix representing the measurement data,
$X_{tr}$, $X_{op}$, and $X_{ts}$ are matrices respectively representing a data set for training, a data set for optimization, and a data set for test,
n is a positive integer,
m is the number of the power plant instruments, and
i=0, 1, 2, . . . , n−1.

2. The prediction method of claim 1, wherein the normalizing the measurement data is performed through the following Equation:

$$Z_i = \frac{X_i - \min(X_i)}{\max(X_i) - \min(X_i)}$$

where i=1,2, . . . , 3n
where $X_i$ is a measurement variable and $Z_i$ is a normalized variable of $X_i$.

3. The prediction method of claim 1, wherein the trisecting the normalized measurement data set is performed through the following equation, each of the three trisected normalized data sets having an n×m dimension:

$$Z_{ts}=[Z_{3i+1,1} \ Z_{3i+1,2} \ldots Z_{3i+1,m}]$$

$$Z_{tr}=[Z_{3i+2,1} \ Z_{3i+2,2} \ldots Z_{3i+2,m}]$$

$$Z_{op}=[Z_{3i+3,1} \ Z_{3i+3,2} \ldots Z_{3i+3,m}]$$

where i=0, 1, 2, n−1, the normalized measurement data set being referred to as Z, the normalized training data set being referred to as $Z_{tr}$, the data set for optimization being referred to as $Z_{op}$, and the data set for test being referred to as $Z_{ts}$.

4. The prediction method of claim 1, wherein
the normalized training data set, the normalized optimization data set, and the normalized test data set are referred to as $Z_{tr}$, $Z_{op}$, and $Z_{ts}$, respectively,
the principal components of each of the normalized training data set $Z_{tr}$, the normalized optimization data set $Z_{op}$, and the normalized test data set $Z_{ts}$ are extracted,
dispersion of the principal components, which is an eigenvalue of a covariance matrix, is arranged according to a size of the principal component, and sets of principal components $P_{re}$, $P_{op}$, and $P_{ts}$, corresponding to $Z_{tr}$, $Z_{op}$, and $Z_{ts}$ are selected until a cumulative sum reaches greater than 99.5%, starting with a principal component having the largest percentage dispersion value, to extract the principal components of each of the trisected normalized data sets $Z_{tr}$, $Z_{op}$, and $Z_{ts}$.

5. A prediction method for monitoring performance of power plant instruments, comprising:
displaying measurement data in a matrix;
normalizing the measurement data into a normalized measurement data set;
trisecting the normalized measurement data set into three data sets, wherein the three trisected data sets comprising a normalized training data set, a normalized optimization data set, and a normalized test data set;
extracting principal components of each of the three trisected data sets;
calculating an optimal constant of a Support Vector Regression (SVR) model, based on the normalized measurement data set and the extracted principal components thereof, to optimize prediction value errors of data for optimization with a response surface method;
generating the SVR training model with the optimal constant;
obtaining a Kernel function matrix with the normalized test data set as an input and predicting an output value of the SVR training model; and
de-normalizing the output value into an original range to obtain a predicted value of a variable, wherein:
the normalized training data set, the normalized optimization data set, and the normalized test data set are referred to as $Z_{tr}$, $Z_{op}$, and $Z_{ts}$, respectively,
the principal components of each of the normalized training data set $Z_{tr}$, the normalized optimization data set $Z_{op}$, and the normalized test data set $Z_{ts}$, are extracted,
dispersion of the principal components, which is an eigenvalue of a covariance matrix, is arranged according to a size of the principal component, and
sets of principal components $P_{re}$, $P_{op}$, and $P_{ts}$ corresponding to $Z_{tr}$, $Z_{op}$, and $Z_{ts}$ are selected until a cumulative sum reaches greater than 99.5%, starting with a principal component having the largest percentage dispersion value, to extract the principal components of each of the trisected normalized data sets $Z_{tr}$, $Z_{op}$, and $Z_{ts}$,
a matrix obtained by subtracting an average value of each variable from each of the data sets $Z_{tr}$, $Z_{op}$, and $Z_{ts}$, is called a matrix A and is represented by the following equation:

$$A = Z_{tr} - \overline{Z_{tr}}$$

6. The prediction method of claim 5, wherein eigenvalues λ of $A^T A$ and a singular value matrix S of A are obtained through the following equations:

$$|A^t A - \lambda I| = 0$$

$$s_1 = \sqrt{\lambda_1}, s_2 = \sqrt{\lambda_2}, \ldots, s_m = \sqrt{\lambda_m}, (\lambda_1 \geq \lambda_2 \geq \Lambda \geq \lambda_m)$$

$$S = \begin{bmatrix} s_1 & 0 & \ldots & 0 \\ 0 & s_2 & \ldots & 0 \\ \vdots & \vdots & \ddots & 0 \\ 0 & 0 & \ldots & s_m \end{bmatrix}$$

where:
the eigenvalues λ except for 0 are arranged in a descending order and the arranged eigenvalues λ are called $\lambda_1$, $\lambda_2$, . . . , $\lambda_m$, respectively, and each of the three trisected normalized data sets has an n×m dimension.

7. The prediction method of claim 6, wherein an eigenvector of $AA^T$ that is an n×n matrix is obtained, and then a unitary matrix U is obtained, and a particular eigenvalue $\lambda$ is obtained through the following Equation A and then is substituted into the following Equation B to obtain an eigenvector $e_1, e_2, e_m$ of n×1 with respect to the particular eigenvalue $\lambda$:

$$|AA^T - \lambda I| = 0 \qquad \text{Equation A}$$

$$(AA^T - \lambda I)X = 0 \qquad \text{Equation B}.$$

8. The prediction method of claim 7, wherein the dispersion ($\sigma_p$) of each of the principal components of each of the data sets $Z_{tr}, Z_{op}$, and $Z_{ts}$ is obtained through the following Equation:

$$\sigma_P = \left(\frac{[s_1 \; s_2 \; \ldots \; s_m]}{\sqrt{n-1}}\right)^2.$$

9. The prediction method of claim 8, wherein the percentage is obtained by dividing dispersion of each principal component by the sum of dispersions ($\sigma_{p\_tot}$) of the principal components of each of the data sets $Z_{tr}, Z_{op}$, and $Z_{ts}$ through the following equations:

$$\sigma_{p\_tot} = sum\left(\frac{[s_1 \; s_2 \; \ldots \; s_m]}{\sqrt{n-1}}\right)^2$$

$$\% \; \sigma_p = \left(\frac{\sigma_p}{\sigma_{p\_tot}}\right) \times 100.$$

10. The prediction method of claim 9, wherein a number is selected such that the selected number of the principal components cumulatively satisfy preferred percentage dispersion by performing a cumulative calculation starting with the largest percentage dispersion $\%\sigma_p$.

11. The prediction method of claim 10, wherein
p denotes the selected number, and
the principal components $P_{tr}$ of the data set $Z_{tr}$ are extracted through the following equation $$P_{tr} = [s_1 e_1 \; s_2 e_2 \ldots s_p e_p]$$

where $e_1, e_2, \ldots$, and $e_p$ are obtained with the Equation B of claim 8.

12. The prediction method of claim 11, wherein compressing input variables $x_i, x_2, x_n$, of an m-dimension into the principal components $\theta_1, \theta_2, \ldots, \theta_m$ of a p-dimension is performed through the following equations:

$$\theta_1 = q_{11}x_1 + q_{12}x_2 + \cdots + q_{1m}x_m$$
$$\theta_2 = q_{21}x_1 + q_{22}x_2 + \cdots + q_{mn}x_m$$
$$\ldots$$
$$\theta_p = q_{p1}x_1 + q_{p2}x_2 + \cdots + q_{pm}x_m$$

where $q_{i1}, q_{i2}, \ldots, g_{im}$, satisfy the following two conditions:

$$q_{i1}^2 + q_{i2}^2 + \ldots + q_{im}^2 = 1, \; i=1, 2, \ldots, m$$

$$q_{i1}q_{j1} + q_{i2}q_{j2} + \ldots + q_{im}q_{jm} = 0, \; i \neq j.$$

13. The prediction method of claim 12, wherein an Optimum Regression Line (ORL) $f_k(\theta)$ obtained as the Support Vector Regression (SVR) with respect to a $k^{th}$ output is represented by the following equation:

$$f_k(\theta) = w_K^T + b_k$$

where:
k is 1, 2, . . . , m,
$\theta = [\theta_1 \theta_2 \ldots \theta_p]^T$,
$w_k$ is a $k^{th}$ p-dimensional weight vector, and
$b_k$ is a $k^{th}$ bias term.

14. The prediction method of claim 13, wherein, when an $\epsilon$-insensitive Loss Function $L_k(y_k)$ with respect to a $k^{th}$ output variable $y^{(k)}$ is defined by the first line of the following equations, and an optimization equation for obtaining an ORL $f_k(\theta)$ with respect to (k) $_i$ $y^{(k)}$ is represented by the second through fifth lines of the following equations:

$$L_k(y_k) = \begin{cases} 0, & |f_k(\theta) - y^{(k)}| < \varepsilon_k \\ |f_k(\theta) - y^{(k)}| - \varepsilon_k, & \text{elsewhere} \end{cases}$$

$$\text{Minimize } \Phi(w_k, \xi_k) = \frac{1}{2} w_k^T w_k + C_k \sum_{i=1}^{n} (\xi_{k,i} + \xi_{k,i}^*)$$

$$\text{s.t. } y_i^{(k)} - w_k^T \theta_i - b \leq \varepsilon_k + \xi_{k,i}$$

$$w_k^T \theta_i + b - y_i^{(k)} \leq \varepsilon_k + \xi_{k,i}^*$$

$$\varepsilon_k, \xi_{k,i}, \xi_{k,i}^* \geq 0 \text{ for } i = 1, 2, \ldots, n$$

where:
k is 1, 2, . . . , m and $\zeta_{ki}$ and $\zeta_{ki}^*$ are slack variables,
$\epsilon_k$ is a $k^{th}$ error term,
$C_k$ is a $k^{th}$ coefficient term, and
b is a bias term.

15. The prediction method of claim 14, wherein the optimization problem is represented as a dual problem by the following equation:

$$\max \lambda_k, \lambda_k^* \left\{ -\frac{1}{2} \sum_{i=1}^{n} \sum_{j=1}^{n} (\lambda_{k,i} - \lambda_{k,i}^*) \theta_i^T \theta_j + \right.$$

$$\left. \sum_{i=1}^{n} [\lambda_{k,i}(y_i^{(k)} - \varepsilon_k) - \lambda_{k,j}^*(y_i^{(k)} - \varepsilon_k)] \right\}$$

$$\text{s.t. } 0 \leq \lambda_{k,i}, \lambda_{k,j}^* \leq C_k \text{ for } i = 1, 2, \ldots, n$$

$$\sum_{i=1}^{n} (\lambda_{k,i} - \lambda_{k,j}^*) = 0$$

where:
k is 1, 2, . . . , m,
j is 1, 2, . . . , n, and
$\lambda_{k, i}$ and $\lambda k_{k,j}^*$ are Lagrange multipliers.

16. The prediction method of claim 15, wherein the Lagrange multipliers $\lambda_{k, i}$, and $\lambda_{k,j}^*$ are substituted into the following equation to determine an ORL $f_k(\theta)$ with respect to a $k^{th}$ output variable of Auto Associative Support Vector Regression (AASVR):

$$f_k(\theta) = w_k^{*T}\theta + b_k^* = \sum_{i=1}^{n} (\lambda_{k,i} - \lambda_{k,j}^*)\theta_i^T \theta + b_k^*$$

where:
$w_k^*$ is an optimized $k^{th}$ p-dimensional weight vector, and
$b_k^*$ is an optimized $k^{th}$ bias term.

17. The prediction method of claim 16, wherein, when the result of nonlinearly mapping from primal data into a space of high-dimension is called a vector $\Phi(\cdot)$, that is the result of the nonlinear mapping:

$$f_k(\theta) = \sum_{i=1}^{n} (\lambda_{k,i} - \lambda_{k,j}^*) K(\theta_i, \theta) + b_k^*.$$

18. The prediction method of claim 17, wherein the optimized $k^{th}$ bias term is calculated with $\theta_r$ and $\theta_s$, which are arbitrary support vectors, through the following equation:

$$b_k^* = -\frac{1}{2} \sum_{i=1}^{n} (\lambda_{k,i} - \lambda_{k,j}^*)[K(\theta_i, \theta_r) + K(\theta_i, \theta_s)].$$

19. A prediction method for monitoring performance of power plan instruments, comprising:
displaying measurement data in a matrix;
normalizing the measurement data into a measurement data set;
trisecting the normalized measurement data set into three data sets, wherein the three trisected data sets comprising a normalized training data set $Z_{tr}$, a normalized optimization data set $Z_{op}$, and a normalized test data set $Z_{ts}$;
extracting principal components of the normalized measurement data set;
calculating an optimal constant of a Support Vector Regression (SVR) model, based on the normalized measurement data set and the extracted principal components thereof, to optimize prediction value errors of data for optimization with a response surface method;
generating the Support Vector Regression (SVR) model with the optimal constant;
obtaining a Kernel function matrix with the normalized measurement data set as an input and predicting an output value of the SVR model; and
de-normalizing the output value into an original range to obtain a predicted value of a variable, wherein:
the calculating of the optimal constant of the SVR model includes:
determining a plurality of optimal constant values,
obtaining a bias constant of an SVR model for each optimal constant value using the normalized measurement data set, and
calculating a mean squared error (MSE) of the SVR model for each optimal constant value by inputting the principal components to the SVR model for each optimal constant value,
a matrix obtained by subtracting an average value of each variable from each of the data sets $Z_{tr}$, $Z_{op}$, and $Z_{ts}$, is called a matrix A and is represented by the following equation:

$$A = Z_{tr} - \overline{Z}_{ts}$$

wherein eigenvalues $\lambda$ of $A^T A$ and a singular value matrix S of A are obtained through the following equations:

$$|A^t A - \lambda I| = 0$$
$$s_1 = \sqrt{\lambda_1}, s_2 = \sqrt{\lambda_2}, \ldots, s_m = \sqrt{\lambda_m}, (\lambda_1 \geq \lambda_2 \geq \ldots \geq \lambda_m)$$
$$S = \begin{bmatrix} s_1 & 0 & \ldots & 0 \\ 0 & s_2 & \ldots & 0 \\ \vdots & \vdots & \ddots & 0 \\ 0 & 0 & \ldots & s_m \end{bmatrix}$$

where:
the eigenvalues $\lambda$ except for 0 are arranged in a descending order and the arranged eigenvalues $\lambda$ are called $\lambda_1, \lambda_2, \ldots, \lambda_m$, respectively, and
each of the three trisected normalized data sets has an n×m dimension.

* * * * *